United States Patent
Zhang et al.

(10) Patent No.: US 9,397,785 B1
(45) Date of Patent: Jul. 19, 2016

(54) ERROR DETECTION IN A SIGNAL FIELD OF A WLAN FRAME HEADER

(75) Inventors: Hongyuan Zhang, Fremont, CA (US); Sudhir Srinivasa, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 890 days.

(21) Appl. No.: 13/085,134

(22) Filed: Apr. 12, 2011

Related U.S. Application Data

(60) Provisional application No. 61/323,265, filed on Apr. 12, 2010.

(51) Int. Cl.
*H04L 1/00* (2006.01)

(52) U.S. Cl.
CPC .................... *H04L 1/0061* (2013.01)

(58) Field of Classification Search
None
See application file for complete search history.

(56) References Cited

U.S. PATENT DOCUMENTS

| | | | |
|---|---|---|---|
| 7,599,332 B2 | 10/2009 | Zelst et al. | |
| 7,626,576 B2* | 12/2009 | Anandakumar et al. | 345/173 |
| 7,742,390 B2 | 6/2010 | Mujtaba | |
| 8,223,072 B2* | 7/2012 | Ponnuswamy | 342/374 |
| 8,234,551 B2* | 7/2012 | Shen et al. | 714/781 |
| 8,289,869 B2 | 10/2012 | Sawai | |
| 8,509,051 B2* | 8/2013 | Ling et al. | 370/203 |
| 8,619,907 B2 | 12/2013 | Mujtaba et al. | |
| 9,131,528 B2* | 9/2015 | Zhang | H04W 84/02 |
| 9,184,794 B1* | 11/2015 | Ibrahim | H04B 3/542 |
| 9,184,967 B1* | 11/2015 | Ibrahim | H04B 3/542 |
| 9,232,435 B2* | 1/2016 | Schliwa-Bertling | H04W 28/06 |
| 9,258,829 B1* | 2/2016 | Ibrahim | H04W 74/0816 |
| 2003/0142626 A1* | 7/2003 | Umayabashi et al. | 370/236.2 |
| 2005/0169261 A1* | 8/2005 | Williams et al. | 370/389 |
| 2007/0014375 A1* | 1/2007 | Nakao | 375/260 |
| 2009/0103485 A1* | 4/2009 | Singh et al. | 370/329 |
| 2010/0074277 A1* | 3/2010 | Nishibayashi et al. | 370/474 |
| 2011/0149927 A1* | 6/2011 | Stacey et al. | 370/338 |
| 2011/0194655 A1* | 8/2011 | Sampath et al. | 375/341 |
| 2013/0259017 A1* | 10/2013 | Zhang | H04W 84/02 370/338 |
| 2014/0064194 A1* | 3/2014 | Schliwa-Bertling | H04W 28/06 370/329 |
| 2014/0337690 A1* | 11/2014 | Zhang | H03M 13/2933 714/776 |
| 2015/0207521 A1* | 7/2015 | Waters | H04L 1/0041 714/807 |
| 2015/0381311 A1* | 12/2015 | Zhang | H04W 84/02 714/800 |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Gregory Sefcheck

(57) ABSTRACT

In a method for generating data units for transmission via a wireless network, a first signal field that includes formatting information for a data unit is generated, and a CRC field for the first signal field is generated according to a generator polynomial. Further, a second signal field that includes formatting information for the data unit is generated, and a CRC field for the second signal field is generated according to the generator polynomial. Further, the data unit is generated to include i) the CRC for the second signal field and ii) a preamble having a) the first signal field, b) the CRC for the first signal field, and c) the second signal field.

22 Claims, 18 Drawing Sheets

(56) References Cited

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, pp. 1-83 (Sep. 1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, pp. 1-92, (1999) Reaffirmed (Jun. 12, 2003).

IEEE Std 802.11b-1999 (Supplement to ANSI/IEEE Std 802.11, 1999 Edition) "Supplement to IEEE Standard for Information technology—Telecommunications and information exchange between systems-Local and metropolitan area networks-Specific requirements Part 11: Wireless LAN Medium Access Control (MAC) and Physical Layer (PHY) specifications: Higher-speed Physical Layer Extension in the 2.4 GHz Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems-Local and metropolitan area networks-Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology-Telecommunications and information exchange between systems-Local and metropolitan area networks-Specific requirements- Part 11: Wireless LAN Medium Access Control (MAC) and Physical Layer (PHY) specifications: Further Higher-Speed Physical Layer Extension in the 2.4 GHz Band, " *The Institute of Electrical and Electronics Engineers, Inc.*, pp. 1-53 (May 2002).

IEEE Std 802.11g/D8.2, Apr 2003 (Supplement to ANSI/IEEE Std 802.11, 1999 (Reaff 2003)) "Draft Supplement to Standard [for] Information technology-Telecommunications and information exchange between systems-Local and metropolitan area networks-Specific requirements, Part 11: Wireless LAN Medium Access Control (MAC) and Physical Layer (PHY) specifications: Further Higher Data Rate Extension in the 2.4 GHz Band, " *The Institute of Electrical and Electronics Engineers, Inc.*, pp. 1-69 (Apr. 2003).

IEEE Std P802.11-REVma/06.0, (Revision of IEEE Std 802.11-1999) "Unapproved Draft Standard for Information Technology-Telecommunications and information exchange between systems—Local and metropolitan area network-Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.Nov. 2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. Jan. 1-184 (Jun. 12, 2007).

IEEE Std 802.11TM 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. Jan. 2695 (Mar. 29, 2012).

Chen, "Home Network Basis: Transmission Environments and Wired/Wireless Protocols," *Prentice Hall*, pp. 1-26 (Jul. 2003).

Hiertz et al., "The IEEE 802.11 Universe," *IEEE Communications Magazine*, pp. 62-70, (Jan. 2010).

Mujtaba, "IEEE P802.11—Wireless LANs, TGn Sync Proposal Technical Specification," The Institute of Electrical and Electronics Engineers, Inc., doc.: IEEE 802.11-04/0889r6, pp. 1-131 (May 2005).

IEEE P802.11nTM/D3.00, "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).

IEEE Std. 802.11nTM "IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).

van Nee et al. "The 802.11n MIMO-OFDM Standard for Wireless LAN and Beyond," Wireless Personal Communications, vol. 37, pp. 445-453 (Jun. 2006).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, Institute for Electrical and Electronics Engineers, pp. 1-49, (Jan. 18, 2011).

* cited by examiner

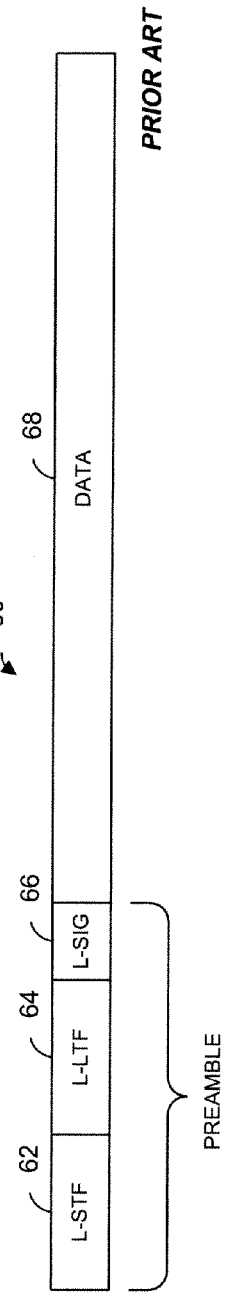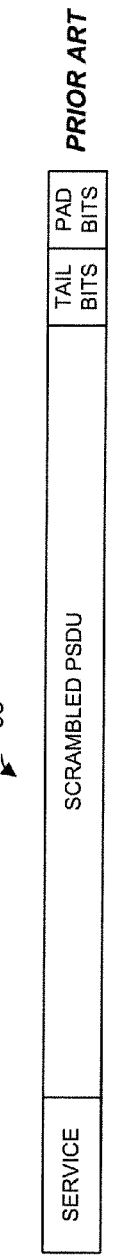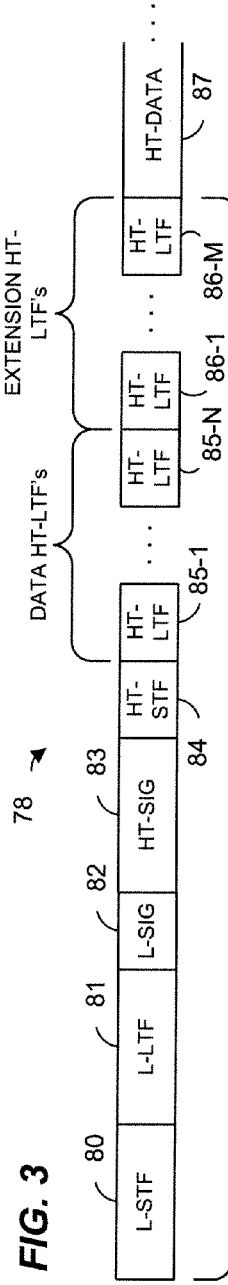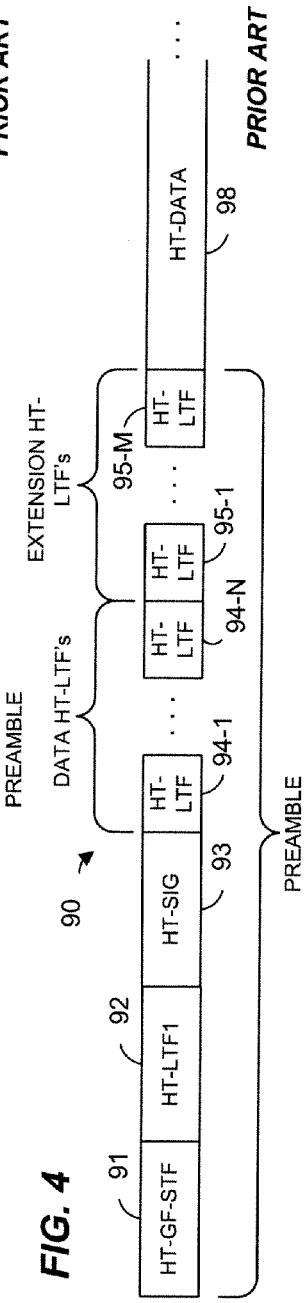

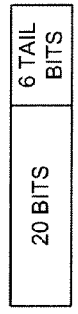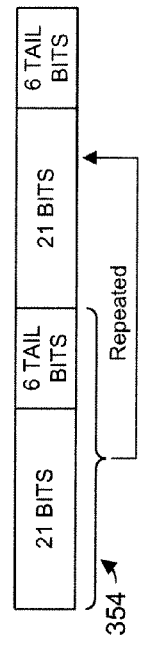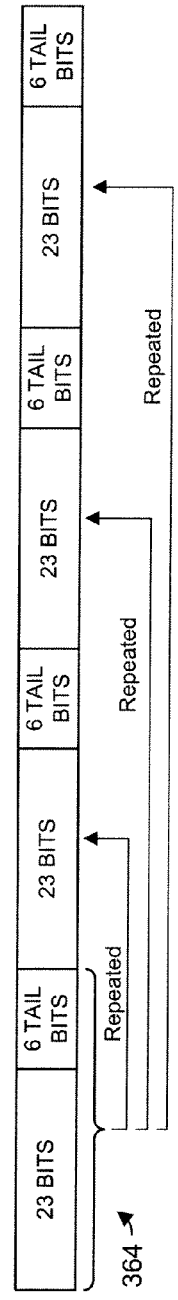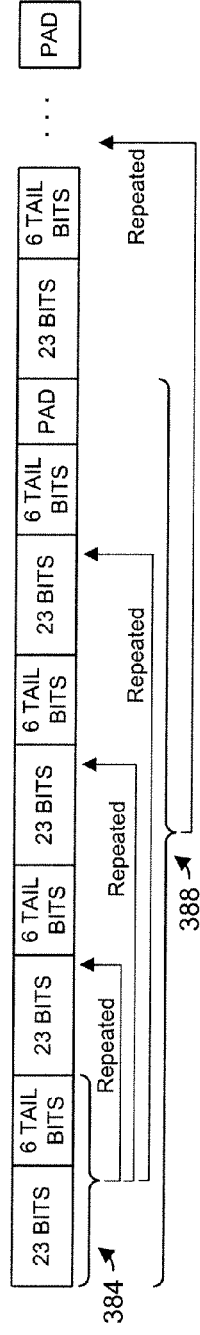
FIG. 9A
FIG. 9B
FIG. 9C
FIG. 9D

FIG. 12

| DURATION | BW | SGI | SMOOTH | STBC | MU/SU | GRP ID | RESOLVE LTF | NSS | MU RSVD | ADDITIONAL | CRC | TAIL |
|---|---|---|---|---|---|---|---|---|---|---|---|---|
| 12 | 4 | 1 | 1 | 1 | 1 | 4 | 1 | 8 | 1 | 4 | 4 | 6 |

660-2, 660-4, 660-6, 660-8, 660-10, 660-12, 660-14, 660-16, 660-18, 660-20, 660-22, 660-24, 660-26

660

| MCS | CODING | RSVD | CRC | TAIL |
|---|---|---|---|---|
| 8 | 1 | 5 | 4 | 6 |

710-2, 710-4, 710-6, 710-8, 710-10

710

US 9,397,785 B1

ERROR DETECTION IN A SIGNAL FIELD OF A WLAN FRAME HEADER

CROSS-REFERENCES TO RELATED APPLICATIONS

This disclosure claims the benefit of U.S. Provisional Patent Application No. 61/323,265, entitled "CRC for 802.1ac VHTSIG Field," filed on Apr. 12, 2010, which is hereby incorporated by reference herein in its entirety.

FIELD OF THE DISCLOSURE

The present disclosure relates generally to communication networks and, more particularly, to detecting errors in a wireless local area network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method for generating data units for transmission via a wireless network comprises generating a first signal field that includes formatting information for a data unit, wherein generating the first signal field includes generating a CRC field for the first signal field according to a generator polynomial. The method also comprises generating a second signal field that includes formatting information for the data unit, wherein generating the second signal field includes generating a CRC field for the second signal field according to the generator polynomial. The method further comprises generating the data unit to include i) the CRC for the second signal field and ii) a preamble of the data unit having a) the first signal field, b) the CRC for the first signal field, and c) the second signal field. In another embodiment, an apparatus includes a wireless network interface configured to generate a first signal field that includes formatting information for a data unit, wherein generating the first signal field includes generating a CRC field for the first signal field according to a generator polynomial. The wireless network interface is also configured to generate a second signal field that includes formatting information for the data unit, wherein generating the second signal field includes generating a CRC field for the second signal field according to the generator polynomial. The wireless network interface is further configured to generate the data unit to include i) the CRC for the second signal field and ii) a preamble of the data unit having a) the first signal field, b) the CRC for the first signal field, and c) the second signal field.

In yet another embodiment, a method for detecting errors in data units includes generating a CRC for a first signal field according to a generator polynomial, wherein the first signal field is included in a preamble of a data unit received via a wireless network, comparing the generated CRC for the first signal field with a received CRC for the first signal field included in the data unit, and determining whether there are one or more errors in the first signal field based on the comparison of the generated CRC for the first signal field with the received CRC for the first signal field. The method also includes generating a CRC for a second signal field according to the generator polynomial, wherein the second signal field is included in the preamble of the data unit, comparing the generated CRC for the second signal field with a received CRC for the second signal field included in the data unit, and determining whether there are one or more errors in the second signal field based on the comparison of the generated CRC for the second signal field with the received CRC for the second signal field.

In still another embodiment, an apparatus includes a wireless network interface configured to generate a CRC for a first signal field according to a generator polynomial, wherein the first signal field is included in a preamble of a data unit received via a wireless network, to compare the generated CRC for the first signal field with a received CRC for the first signal field included in the data unit, and to determine whether there are one or more errors in the first signal field based on the comparison of the generated CRC for the first signal field with the received CRC for the first signal field. The wireless network interface is also configured to generate a CRC for a second signal field according to the generator polynomial, wherein the second signal field is included in the preamble of the data unit, to compare the generated CRC for the second signal field with a received CRC for the second signal field included in the data unit, and to determine whether there are one or more errors in the second signal field based on the comparison of the generated CRC for the second signal field with the received CRC for the second signal field.

BRIEF DESCRIPTION OF THE DRAWINGS

FIGS. 2A and 2B are diagrams of a prior art data unit format.

FIG. 3 is a diagram of another prior art data unit format.

FIG. 4 is a diagram of another prior art data unit format.

FIGS. 9A-9D are diagrams of other example signal fields in a data unit such as the data unit of FIG. 7, according to several embodiments.

FIG. 12 is a diagram of another example signal field in a data unit such as the data unit of FIG. 7, according to yet another embodiment.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol (e.g., the IEEE 802.11ac Standard, now in the process of being standardized). Additionally, a different client station in the vicinity of the AP may be configured to operate according to a second communication protocol (e.g., the IEEE 802.11n Standard, the IEEE 802.11a Standard, the IEEE 802.11g Standard, etc.). Further, in some embodiments, a further client station in the vicinity of the AP may be configured to operate according to a third communication protocol (e.g., another one of the IEEE 802.11n Standard, the IEEE 802.11a Standard, the IEEE 802.11g Standard, etc.). The first communication protocol is referred to herein as a very high throughput (VHT) protocol, and the second and third communication protocols are referred to herein as legacy protocols. In an embodiment, a data unit transmitted by the AP includes a preamble containing a plurality of signal fields that carry information required at the receiver to properly identify and decode the data unit. Further, one or more of the signal fields of the preamble (also referred to herein as "preamble signal fields") are protected by one or more cyclic redundancy check (CRC) bit sequences (also referred to herein as "protection bits") used at the receiver to check correctness of the received signals. When the AP transmits a data unit conforming to a first legacy protocol, the signal field protection bits are generated according to a first technique. Similarly, in an embodiment, when the AP transmits a data unit conforming to the VHT protocol, VHT signal field protection bits are generated according to a second technique. In an embodiment, the first technique and the second technique are the same or similar. This may allow common hardware and/or elements to be used to generate signal field protection bits for either the VHT protocol or the first legacy protocol, at least in some embodiments and/or implementations. In other embodiments, the first technique and the second technique are different techniques.

Figure 1:
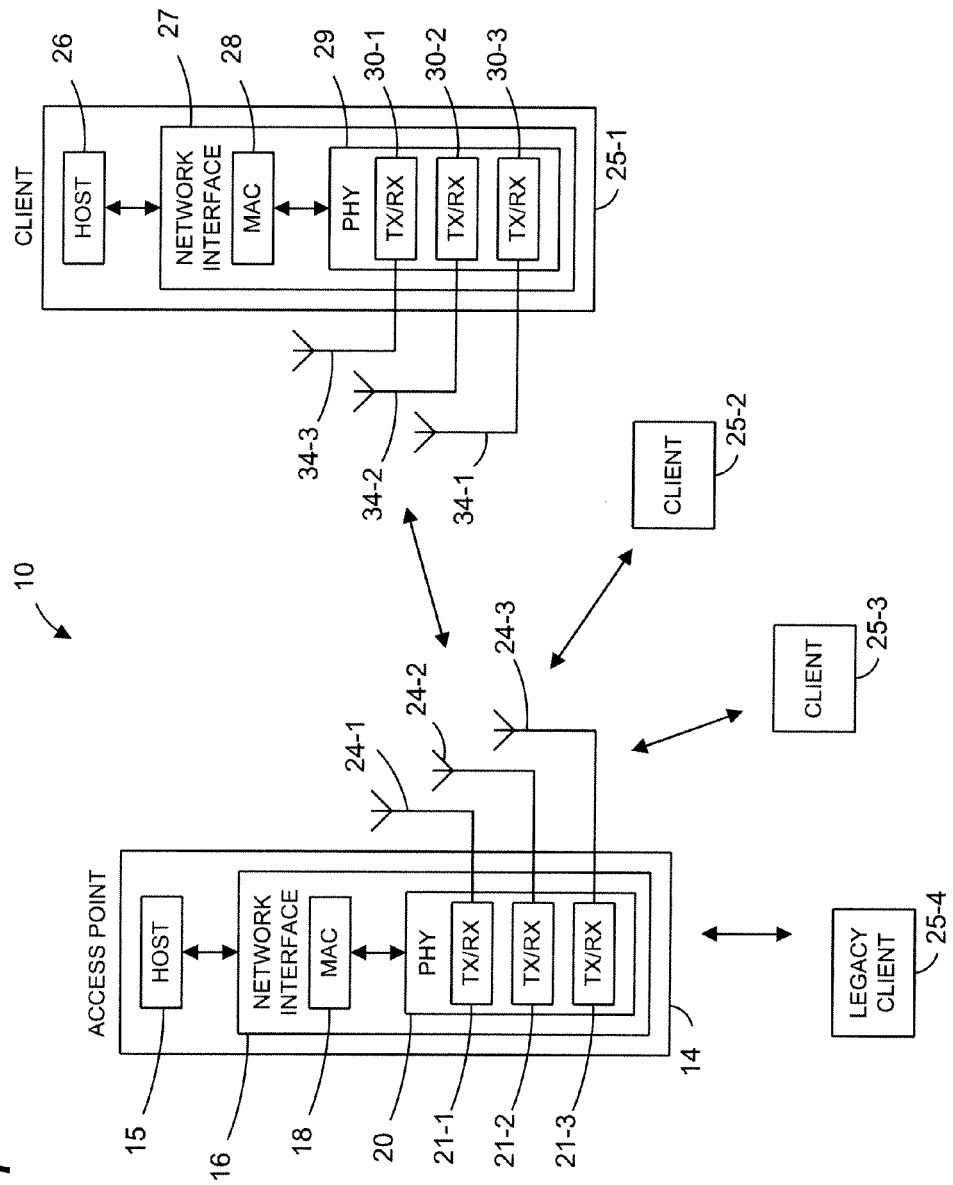
FIG. 1 is a block diagram of an example wireless local area network (WLAN), according to an embodiment.

FIG. 1 is a block diagram of an example wireless local area network (WLAN) 10 that may utilize one or more CRC generation schemes set forth in the present disclosure, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC unit 18 and the PHY processing unit 20 are configured to operate according to the VHT protocol. In another embodiment, the MAC processing unit 18 and the PHY processing unit 20 are also configured to operate according to a legacy protocol.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. At least one of the client stations 25 (e.g., client station 25-1) is configured to operate at least according to the VHT protocol. The WLAN 10 also includes a client station 25-4 that is not configured to operate according to the VHT protocol but is configured to operate according to a legacy protocol, in some embodiments. Such a client station 25-4 is referred to herein as a "legacy client station". In some embodiments and/or scenarios, the WLAN 10 includes more than one legacy client station. In other embodiments and/or scenarios, the WLAN 10 includes no legacy client stations.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 have a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the VHT protocol. The transceiver(s) 21 is/are configured to transmit the generated data units via the antenna(s) 24. Similarly, the transceiver(s) 21 is/are configured to receive data units conforming to the VHT protocol via the antenna(s) 24. The PHY processing unit 20 of the AP 14 is configured to process received data units conforming to the VHT protocol and having formats described hereinafter, and to utilize CRC generation schemes described in the present disclosure.

In various embodiments, the PHY processing unit 29 of the client station 25-1 is configured to generate data units conforming to the VHT protocol. The transceiver(s) 30 is/are configured to transmit the generated data units via the antenna(s) 34. Similarly, the transceiver(s) 30 is/are configured to receive data units conforming to the VHT protocol via the antenna(s) 34. The PHY processing unit 29 of the client station 25-1 is configured to process received data units conforming to the VHT protocol and having formats described hereinafter, and to utilize CRC generation schemes described in the present disclosure to assess correctness of the received data units, according to various embodiments.

FIG. 2A is a diagram of a prior art data unit 60. In an embodiment, the AP 14 is configured to generate and transmit the prior art data unit 60 to the legacy client station 25-4 and/or receive and process the prior art data unit 60, which was transmitted by the legacy client station 25-4. The data unit 60 conforms to the IEEE 802.11a Standard and occupies a 20 Megahertz (MHz) band. The data unit 60 includes a preamble having a legacy short training field (L-STF) 62, a legacy long training field (L-LTF) 64, and a legacy signal field (L-SIG) 66. The data unit 60 also includes a data portion 68. FIG. 2B is a diagram of an example data portion 68 (not low density parity check encoded), which includes a service field, a scrambled physical layer service data unit (PSDU), tail bits, and padding bits, if needed.

FIG. 3 is a diagram of another prior art data unit 78. In an embodiment, the AP 14 is configured to generate and transmit the prior art data unit 78 to the legacy client station 25-4, and/or receive and process the prior art data unit 78, which was transmitted by the legacy client station 25-4. The data unit 78 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 78 includes a preamble having an L-STF 80, an L-LTF 81, an L-SIG 82, a high throughput signal field (HT-SIG) 83, a high throughput short training field (HT-STF) 84, N data high throughput long training fields (HT-LTFs) 85, where N is an integer, and M extension HT-LTFs 86, where M is an integer. The data unit 78 also includes a data portion 87.

FIG. 4 is a diagram of another prior art OFDM data unit 90. In an embodiment, the AP 14 is configured to generate and transmit the prior art data unit 90 to the legacy client station 25-4, and/or receive and process the prior art data unit 90, which was transmitted by the legacy client station 25-4. The data unit 90 conforms to the IEEE 802.11n Standard, occupies a 20 MHz band, and is designed for "Greenfield" situations, i.e., when the WLAN includes a client station that conforms to the IEEE 802.11n Standard and when the WLAN does not include any client stations that conform to the IEEE 802.11a Standard. The data unit 90 includes a preamble having a high throughput Greenfield short training field (HT-GF-STF) 91, a first high throughput long training field (HT-LTF1) 92, a HT-SIG 93, N data HT-LTFs 94, where N is an integer, and M extension HT-LTFs 95, where M is an integer. The data unit 90 also includes a data portion 98.

Figure 5:
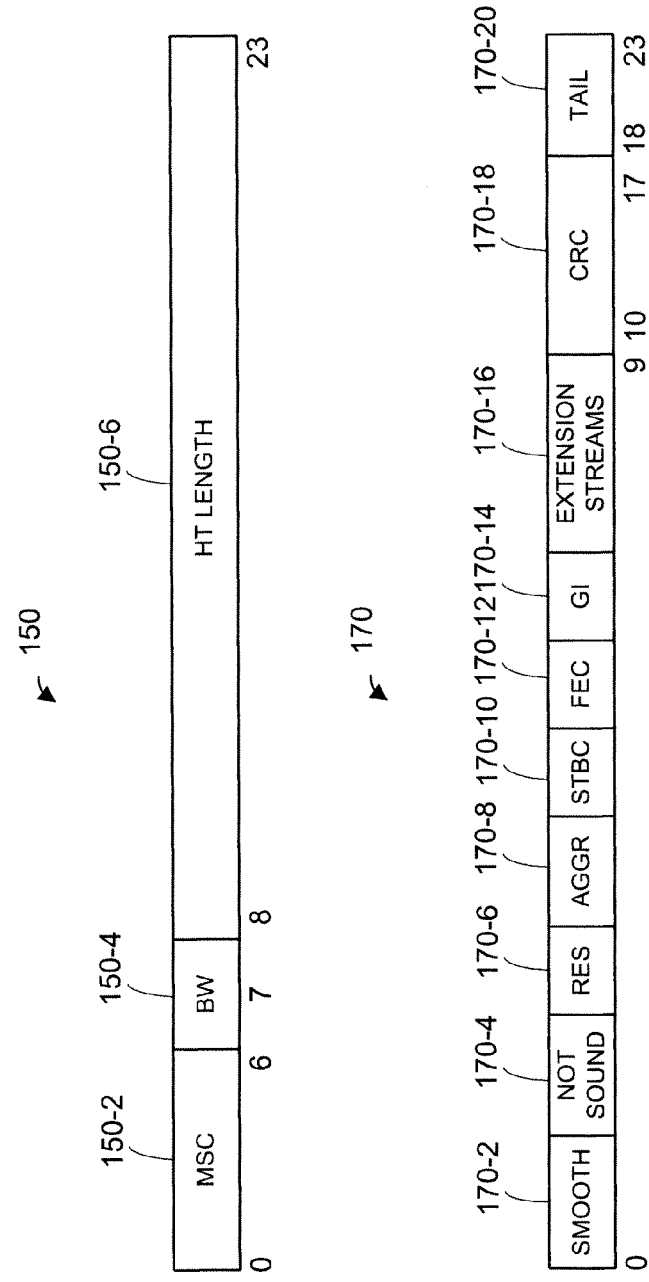
FIG. 5 is a diagram of a bit allocation for a prior art data unit signal field.

FIG. 5 is a diagram of a prior art HT-SIG field 140 included in the preamble of a data unit conforming to the IEEE 802.11n protocol (e.g., HT-SIG 78 in FIG. 3, HT-SIG 90 in FIG. 4). As shown in FIG. 5, the HT-SIG field 140 comprises an HT-SIG1 portion 150 and an HT-SIG2 portion 170, each portion including 24 bits. The HT-SIG1 portion 150 includes a modulation and coding scheme subfield 150-2, a CDW 20/40 subfield 150-4, and an HT length subfield 150-6. Similarly, the HT-SIG2 portion 170 includes a number of subfields including, for example, a smoothing subfield 170-2, a STBC subfield 170-10, an FEC coding subfield 170-12, etc. Further, the HT-SIG2 portion 170 includes 8 cyclic redundancy check (CRC) bits to check correctness of the various HT-SIG subfields, and 6 tail bits required to terminate the trellis of the convolution coder for proper operation.

With reference to FIG. 5, the value of the CRC in the HT-SIG2 CRC subfield 170-18 is defined in the IEEE-802.11n Standard to be the ones compliment of:

$$\text{crc}(D) = (M(D) + I(D))D^8 \text{modulo} G(D) \quad \text{(Equation 1)}$$

where $$M(D) = m_o D^{33} + m_1 D^{32} + \ldots + m_{32} D + m_{33} \quad \text{(Equation 2)}$$

and where $m_i$ are information bits of the HT-SIG1 portion 150 and the HT-SIG2 portion 170, and $D^j$ corresponds to a delay of j units. With continued reference to FIG. 5, $m_o$ in Equation 2 is bit 0 of HT-SIG1 portion 150 and $m_{33}$ in Equation 2 is bit 9 of HT-SIG2 portion 170. I(D) is an initialization polynomial that is added modulo 2 to the first 8 bits of the HT-SIG1 portion 150. I(D) is defined as:

$$I(D) = \sum_{i=26}^{33} D^i \quad \text{(Equation 3)}$$

Continuing with Equation 1, G(D) is the generator polynomial used to generate the 8 CRC bits:

$$G(D) = D^8 + D^2 + D + 1 \quad \text{(Equation 4)}$$

The resulting polynomial, which represents the generated CRC, is then given by:

$$\text{crc}(D) = c_o D^7 + c_1 D^6 + \ldots + c_6 D + c_7 \quad \text{(Equation 5)}$$

Figure 6:
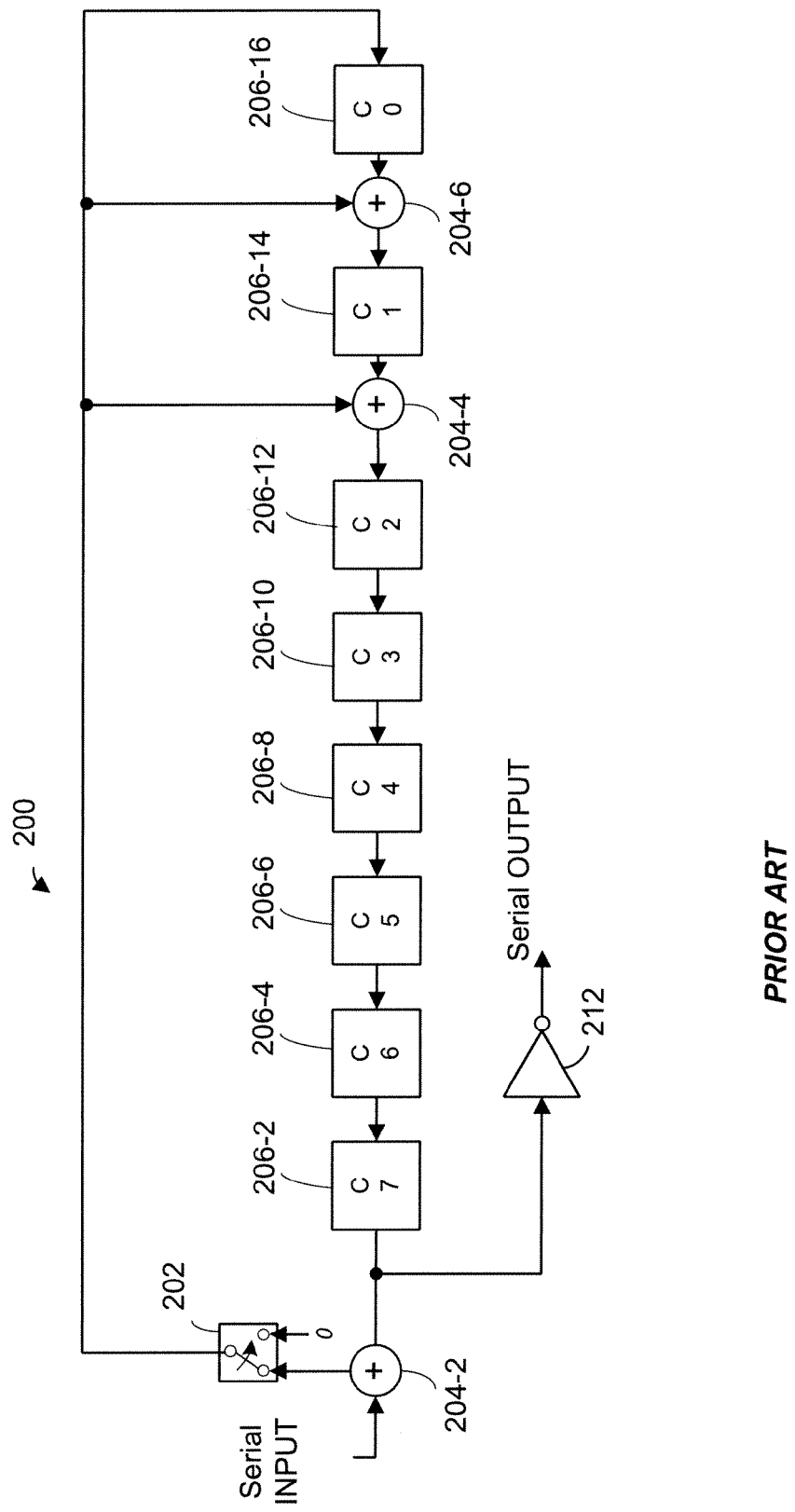
FIG. 6 is a diagram of a prior art cyclic redundancy check (CRC) generator.

FIG. 6 is a diagram of a prior art CRC generator 200 that implements the CRC generation scheme described above, as defined in the IEEE 802.11n Standard. A plurality of delay elements 206 are coupled in series. An adder 204-2 receives as a first input a serial input of bits $m_{33}$ through $m_o$, which correspond to the 24 bits of the HT-SIG1 portion 150 and the first 10 bits of the HT-SIG2 portion 170. The adder 204-2 also receives as a second input an output of the delay element 206-2. The adder 204-2 adds the first input and the second input to generate an output. The output of the adder 204-2 is coupled to a first input of a switch 202. A second input of the switch 202 is coupled to a zero value. An output of the switch 202 is coupled to an input of the delay element 206-16. The output of the switch 202 is also coupled to a first input of an adder 204-4 and a first input of an adder 204-6. A second input of the adder 204-4 is coupled to an output of the delay element 206-14, and an output of the adder 204-4 is coupled to an input of the delay element 206-12. A second input of the adder 204-6 is coupled to an output of the delay element 206-14, and an output of the adder 204-6 is coupled to an input of the delay element 206-12.

In operation, the switch 202 is set so that the output of the adder 204-2 is provided to the delay element 206-16, the adder 204-4, and the adder 204-6 when the HT-SIG1 portion 150 and the first 10 bits of the HT-SIG2 portion 170 are serially provided to the adder 204-2. After the 10-th bit of the HT-SIG2 portion 170 has been provided to the adder 204-2, the switch 202 is set so that the zero value is provided to the delay element 206-16, the adder 204-4, and the adder 204-6, and values are serially shifted out of the delay elements 206. An inverter 212 inverts the values shifted out of the delay elements 206 to generate the CRC bits 170-18 (FIG. 5).

Figure 7:
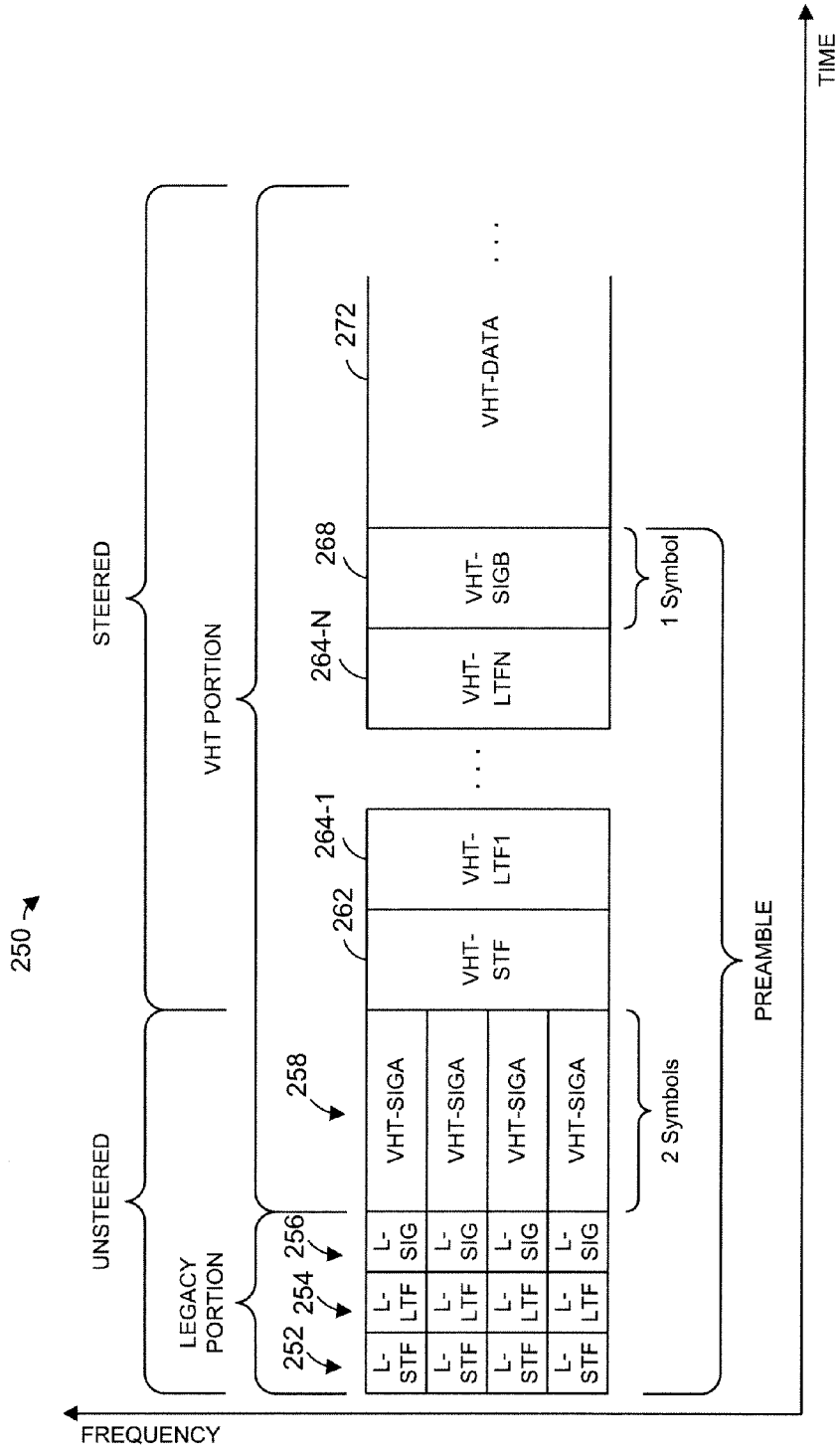
FIG. 7 is a diagram of an example data unit format, according to an embodiment.

FIG. 7 is a diagram of a data unit 250 that the AP 14 is configured to transmit to the client station 25-1, according to an embodiment. In an embodiment, the client station 25-1 is also configured to transmit the data unit 250 to the AP 14. The data unit 250 conforms to the VHT protocol and occupies an 80 MHz band. In other embodiments, data units similar to the data unit 250 occupy different bandwidths such as 20 MHz, 40 MHz, 120 MHz, 160 MHz, or any suitable bandwidth. Additionally, the band need not be contiguous in frequency, but may include two or more smaller bands separated in frequency. For example, according to an embodiment, the data unit 250 occupies a 160 MHz band composed of two non-contiguous 80 MHz bands separated in frequency by some suitable minimum bandwidth, in some scenarios such as when conditions and devices support a 160 MHz channel. The data unit 250 includes a preamble having four L-STFs 252, four L-LTFs 254, four L-SIGs 256, four first very high throughput signal fields (VHT-SIGA) 258 a very high throughput short training field (VHT-STF) 262, N very high throughput long training fields (VHT-LTFs) 264, where N is an integer, and a second very high throughput signal fields (VHT-SIGB) 268. The data unit 250 also includes a data portion 272. The L-STFs 252, the L-LTFs 254, and the L-SIGs 256 form a legacy portion. The VHT-STF 262, the VHT-SIGAs 258, the VHT-LTFs 264, the VHT-SIGB 268, and the data portion 266 form a very high throughput (VHT) portion.

In the embodiment of FIG. 7, each of the L-STFs 252, each of the L-LTFs 254, each of the L-SIGs 256, each of the VHT-SIGIs, and each of the VHT-SIG2s occupy a 20 MHz band. In the present disclosure, several example data units, including the data unit 250, having an 80 MHz contiguous bandwidth are described for the purposes of illustrating embodiments of frame formats, but these frame format embodiments and other embodiments are applicable to other suitable bandwidths (including noncontiguous bandwidths). For instance, although the preamble of FIG. 7 includes four of each of the L-STFs 252, the L-LTFs 254, the L-SIGs 256, and the VHT-SIGAs 258, in other embodiments in which the OFDM data unit occupies a cumulative bandwidth other than 80 MHz, such as 20 MHz, 40 MHz, 120 MHz, 160 MHz, etc., a different suitable number of the L-STFs 252, the L-LTFs 254, the L-SIGs 256, and the VHT-SIGAs 258 is utilized accordingly (e.g., one of each of the L-STFs 252, the L-LTFs 254, the L-SIGs 256, and the VHT-SIGAs 258, for an OFDM data unit occupying 20 MHz, two of each of the fields for a 40 MHz bandwidth OFDM data unit, six of each of the fields for a 120 MHz bandwidth OFDM data unit, and eight of each of the fields for a 160 MHz bandwidth OFDM data unit). Also in a 160 MHz bandwidth OFDM data unit, for example, the band is not contiguous in frequency, in some embodiments and situations. Thus, for example, the L-STFs 252, the L-LTFs 254, the L-SIGs 256, and the VHT-SIGAs 258 occupy two or more bands that are separated from each other in frequency, and adjacent bands are separated in frequency by at least one MHz, at least five MHz, at least 10 MHz, at least 20 MHz, for example, in some embodiments. In the embodiment of FIG. 7, each of the VHT-STF 262, the VHT-LTFs 264, the VHT-SIGB 268, and the data portion 266 occupy an 80 MHz band. If the data unit conforming to the first communication protocol is an OFDM data unit that occupies a cumulative bandwidth such as 20 MHz, 40 MHz, 120 MHz, or 160 MHz OFDM, the VHT-STF, VHT-LTFs, VHT-SIGB and VHT data portion occupy the corresponding whole bandwidth of the data unit, according to an embodiment.

Further, according to the embodiment of FIG. 7 in which the device generating the data unit 250 includes multiple antennas and is capable of transmit beamforming or beamsteering, the VHT-SIGA 258 is included within an unsteered (or "omnidirectional" or "pseudo-omnidirectional"; the terms "unsteered" and "omnidirectional" as used herein are intended to also encompass the term "pseudo-omnidirectional") portion of the data unit 250 and contains PHY information that is common to each of the client stations 25. On the other hand, the VHT-SIGB 268 is contained in a "steered" portion. In an embodiment in which the data unit 250 is a multi-user transmission (e.g., the data unit 250 includes independent data streams for corresponding different receive devices), the steered portion includes different data for different clients 25 that are simultaneously transmitted, via the antennas 24, over different spatial channels to carry different (or "user-specific") content to each of the client stations 25. On the other hand, in an embodiment in which the data unit 250 is a single-user transmission, the steered portion includes data for a particular client 25 that are transmitted and beamsteered, via the antennas 24, to the client station 25.

In other embodiments and/or scenarios in which the device generating the data unit 250 includes multiple antennas and is capable of transmit beamforming or beamsteering, the VHT-SIGB 268 is not transmitted using beamsteering. For example, in an embodiment, VHT-LTFs 264 are transmitted using beamsteering whereas VHT-SIGB 268 is transmitted omnidirectionally. On the other hand, in an embodiment in which the data unit 250 is a single-user transmission, the steered portion includes data for a particular client 25 that are transmitted and beamsteered, via the antennas 24, to the client station 25. As another example, in an embodiment, the entire data unit 250 is transmitted omnidirectionally.

In various embodiments, VHT-SIGAs 258 and VHT-SIGB 268 each includes or has associated therewith one or more CRC bit sequences. In one embodiment, the CRC bits are included in a subfield or subfields of one or more of the VHT-SIGAs 258 and/or VHT-SIGB 268. In another embodiment, one or more of the CRC bit sequences are not included in a subfield of one or more of the VHT-SIGAs 258 and/or VHT-SIGB 268, but are included in a different portion of the data unit 250.

Figure 8:
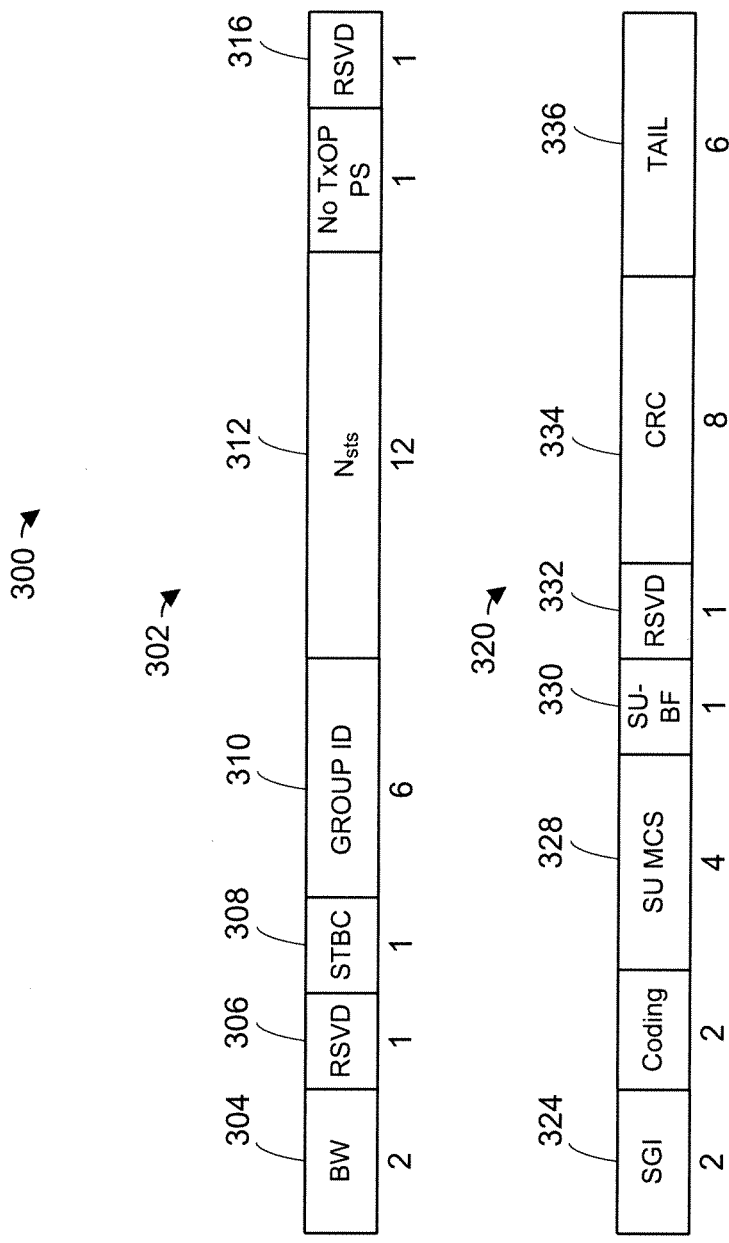
FIG. 8 is a diagram of an example signal field in a data unit such as the data unit of FIG. 7, according to an embodiment.

FIG. 8 is a diagram of an example VHT-SIGA field 300, according to an embodiment. A number of bits allocated to each field is indicated below the corresponding field. The VHT-SIGA field 300 includes a first portion 302 having a bandwidth indication field 304 that indicates a bandwidth of the data unit that includes the VHT-SIGA 300. A field 306 is reserved. A field 308 indicates whether space-time block coding is utilized in the data unit that includes the VHT-SIGA 300. A field 310 indicates a group identifier (ID) when the data unit that includes the VHT-SIGA 300 is a multi-user transmission. The field 310 is set to a predetermined value when the data unit that includes the VHT-SIGA 300 is a single-user transmission, in an embodiment. The field 312 indicates one or more numbers of spatial streams or space-time streams utilized in the data unit that includes the VHT-SIGA 300. If the transmission is a multi-user transmission, groups of three bits indicate the numbers of spatial streams or space-time streams utilized for each station. If the transmission is a single-user transmission, three bits indicate the number of spatial streams or space-time streams utilized, and nine bits include an identifier or partial identifier of the station. A field 316 is reserved.

The VHT-SIGA field 300 also includes a second portion 320 having a field 324 that indicates whether a long guard interval is utilized or whether a short guard interval is utilized. A field 328 indicates a modulation coding set when the data unit that includes the VHT-SIGA 300 is a single user transmission. A field 330 indicates whether beamforming is utilized for the data unit that includes the VHT-SIGA 300. A field 332 is reserved. A field 334 includes CRC bits generated based on applying a generator polynomial to the first portion 302 and bits in the second portion 320 including the fields 324 through 332, inclusive. In an embodiment, the generator polynomial utilized to generate the CRC bits 334 corresponds to Equation 4. A tail bits field 336 include tail bits to extend the portion 320 to 24 bits.

Table 1 is an example of bit allocations for the VHT-SIGB field 268 (FIG. 7), according to an embodiment.

TABLE 1

| SU or MU | Band-width | Bit Allocation | | | | Total No. of Bits |
| --- | --- | --- | --- | --- | --- | --- |
| | | Length | MCS | Reserved | Tail | |
| MU Allocation | 20 MHz | B0-B15 (16) | B16-B19 (4) | N/A | B20-B25 (6) | 26 |
| | 40 MHz | B0-B16 (17) | B17-B20 (4) | N/A | B21-B26 (6) | 27 |
| | 80/160 MHz | B0-B18 (19) | B19-B22 (4) | N/A | B23-B28 (6) | 29 |
| SU Allocation | 20 MHz | B0-B16 (17) | N/A | B17-B19 (3) | B20-B25 (6) | 26 |
| | 40 MHz | B0-B18 (19) | N/A | B19-B20 (2) | B21-B26 (6) | 27 |
| | 80/160 MHz | B0-B20 (21) | N/A | B21-B22 (2) | B23-B28 (6) | 29 |

As can be seen in Table 1, the bit allocation for VHT-SIGB field 268 varies depending on the bandwidth of the transmission and whether the transmission is a single-user transmission or a multi-user transmission, in an embodiment. VHT-SIGB field 268 includes bits indicating a length of useful data in the data unit that includes the VHT-SIGB field 268, in an embodiment. VHT-SIGB field 268 also includes an indication of a modulation and coding scheme for the data unit that includes the VHT-SIGB field 268, at least when the data unit corresponds to a multi-user transmission, in an embodiment.

FIG. 9A is a diagram of an example VHT-SIGB field 345 that is used as the VHT-SIGB field 268 (FIG. 7) when a data unit that includes the VHT-SIGB field 345 is transmitted in a 20 MHz bandwidth, according to an embodiment.

FIG. 9B is a diagram of an example VHT-SIGB field 350 that is used as the VHT-SIGB field 268 (FIG. 7) when a data unit that includes the VHT-SIGB field 345 is transmitted in a 40 MHz bandwidth, according to an embodiment. The VHT-SIGB field 350 includes a 27-bit portion 354 that is repeated once.

FIG. 9C is a diagram of an example VHT-SIGB field 360 that is used as the VHT-SIGB field 268 (FIG. 7) when a data unit that includes the VHT-SIGB field 345 is transmitted in an 80 MHz bandwidth, according to an embodiment. The VHT-SIGB field 360 includes a 29-bit portion 364 that is repeated three times.

FIG. 9D is a diagram of an example VHT-SIGB field 380 that is used as the VHT-SIGB field 268 (FIG. 7) when a data unit that includes the VHT-SIGB field 345 is transmitted in a 160 MHz bandwidth, according to an embodiment. The VHT-SIGB field 360 includes a 29-bit portion 364 that is repeated three times in a portion 388. Additionally, a padding bit is added to the portion 388. The portion 388 repeated once.

In an embodiment, CRC bits corresponding to the VHT-SIGB field 268 are generated based on applying a generator polynomial to bits corresponding to Table 1. For example, with the example VHT-SIGB field 345 of FIG. 9A, the generator polynomial is applied to the 20 bits (not including the tail bits). As another example, with the example VHT-SIGB field 350 of FIG. 9B, the generator polynomial is applied to the 21 bits of the portion 354 (not including the tail bits). As another example, with the example VHT-SIGB field 360 of FIG. 9C, the generator polynomial is applied to the 23 bits of the portion 364 (not including the tail bits). As another example, with the example VHT-SIGB field 380 of FIG. 9D, the generator polynomial is applied to the 23 bits of the portion 384 (not including the tail bits).

In an embodiment, the generator polynomial utilized to generate the CRC bits for the VHT-SIGB field 268 corresponds to Equation 4. In an embodiment, eight CRC bits are generated and the CRC bits are not included in the VHT-SIGB field 268 (FIG. 7). For example, the CRC bits are included in another portion of the data unit 250 (FIG. 7) such as another location in the preamble or in the VHT-Data portion 272 (FIG. 7), in an embodiment. In another embodiment, the CRC bits are included in the VHT-SIGB field 268 (FIG. 7).

Figure 10:
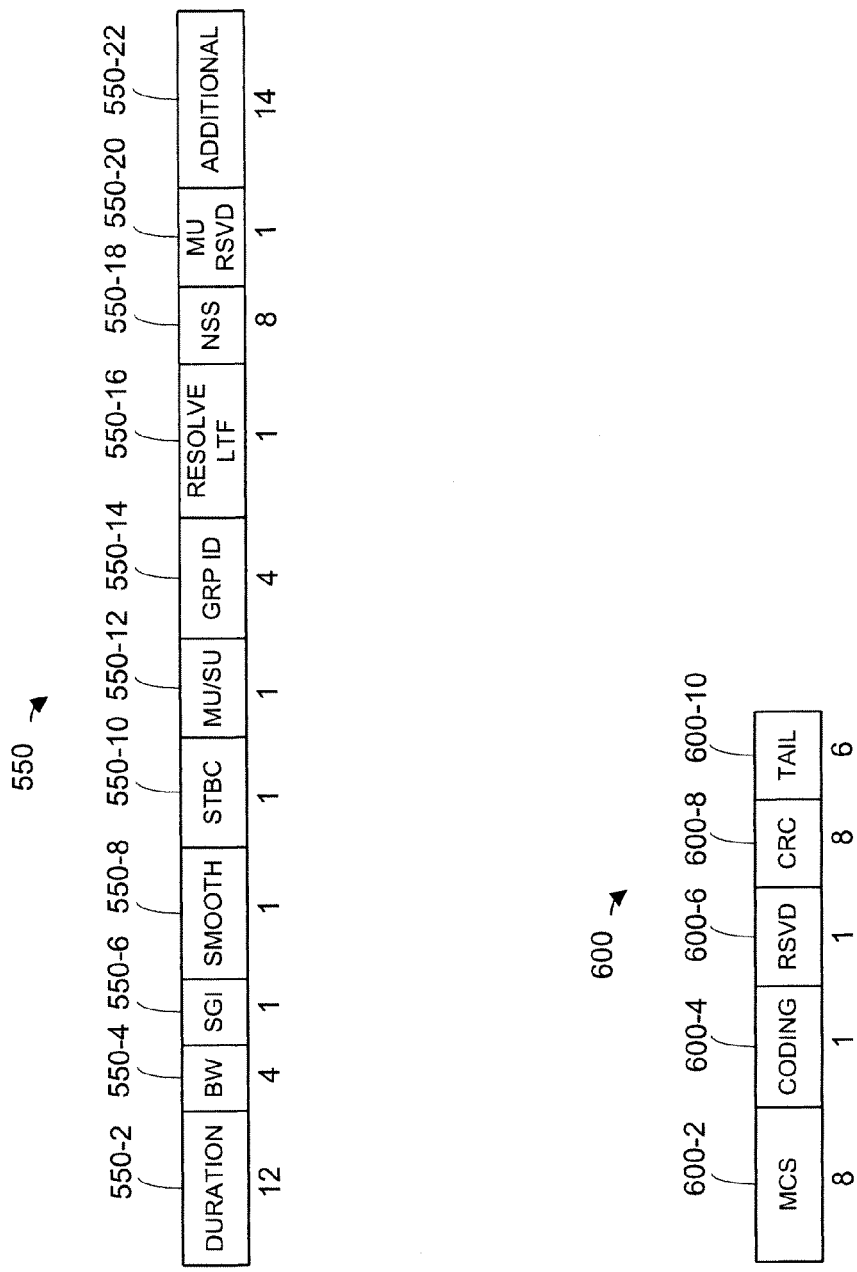
FIG. 10 is a diagram of another example signal field in a data unit such as the data unit of FIG. 7, according to an embodiment.
Figure 11:
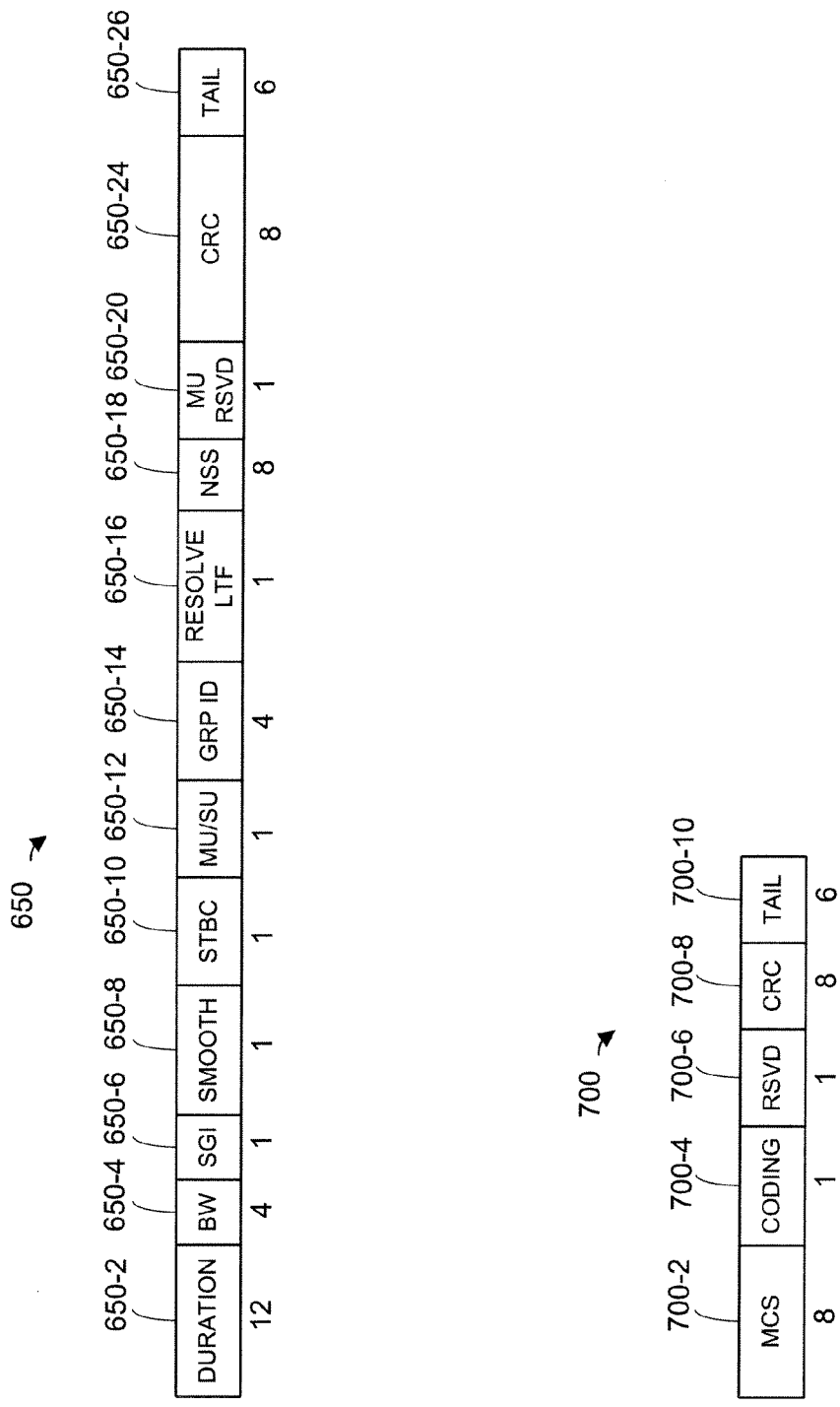
FIG. 11 is a diagram of another example signal field in a data unit such as the data unit of FIG. 7, according to another embodiment.

Other suitable bit allocations for VHT-SIGA and VHT-SIGB are utilized in other embodiments. For example, FIG. 10 are diagrams of example bit allocations in VHT-SIGA 550 and VHT-SIGB 600, according to an embodiment. As shown in FIG. 10, VHT-SIGB 600 contains an 8-bit CRC subfield 600-8. In an embodiment, the CRC subfield 600-8 is generated using all 24 bits of VHT-SIGA 550, and the first 10 bits of VHT-SIGB 600. Alternatively, in another embodiment, a separate CRC is generated for the bits of each of the segments VHT-SIGA and VHT-SIGB. For example, FIG. 11 illustrates bit allocation in VHT-SIGA 650 and VHT-SIGB 700, according to another embodiment. Bit allocation shown in FIG. 11 is similar to bit allocation shown in FIG. 10, except that the additional subfield 550-22 in FIG. 10 is replaced by a CRC subfield 650-24, followed by a tail subfield 650-26. In the embodiment of FIG. 11, the CRC bits in subfield 550-22 is generated using the first 34 bits of VHT-SIGA 650, and the CRC bits in subfield 700-8 is generated using the first 10 bits of VHT-SIGB 700.

In some embodiments, the CRC subfields described above contain a number of bits that is different from the 8 bits discussed above with reference to FIGS. 8-11. If the number of CRC bits used is less than 8 bits, the generator polynomial of Equation 4 is utilized to generate eight bits, and the number of CRC bits is shortened to, for example, four bits using a suitable technique, in some embodiments. In other embodiments, a suitable generator polynomial different than Equation 4 is utilized to generate four, six, eight, ten, or any other suitable number of CRC bits. FIG. 12 shows VHT-SIG bit allocation according to an embodiment. In the embodiment of FIG. 12, 4 bits are allocated to each of the CRC subfields 660-24 and 710-8. In this embodiment, the CRC bits in subfield 660-24 are generated using the first 38 bits of VHT-SIGA 660, and the CRC bits in subfield 710-8 are generated using the first 14 bits of VHT-SIGB 600. Alternatively, the CRC subfields described above include 6 bits or any other suitable number of bits. An advantage of using shorter CRC subfields is that the extra bits that are not used for the CRC can be allocated for additional signal data, for example. On the other hand, in some embodiments, longer CRC subfields are used, reducing the number of bits available for signal data, to provide better protection for the signal fields, for example.

Figure 13:
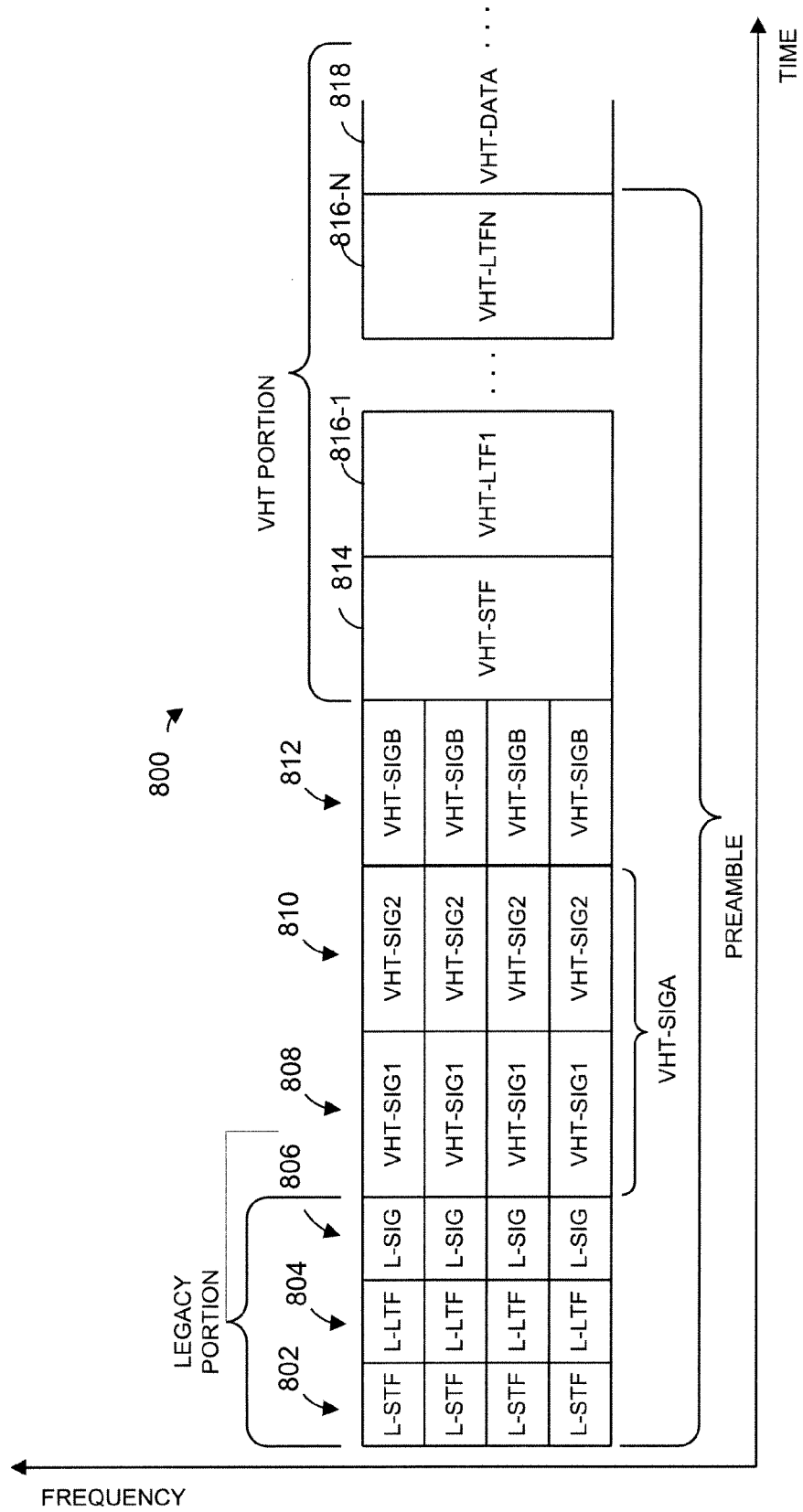
FIG. 13 is a diagram of an example data unit format, according to another embodiment.

Data unit formats other than that of the example data unit 250 of FIG. 7 are utilized in other embodiments and/or scenarios. For example, FIG. 13 is a diagram of an example data unit 800 that the AP 14 is configured to transmit to the client station 25-1, according to an embodiment. In an embodiment, the client station 25-1 is also configured to transmit the data unit 800 to the AP 14. The data unit 800 is similar to the data unit 250 in FIG. 7. The data unit 800 includes two VHT-SIG fields (VHT-SIG1 808 and VHT-SIG2 810) that generally correspond to VHT-SIGA 258 (FIG. 7). The data unit 800 includes third very high throughput signal fields (VHT-SIGBs 312) to convey physical layer (PHY) information. In an embodiment, a first CRC field is generated using bits in both VHT-SIG1 808 and VHT-SIG2 810, and a second CRC field is generated using bits in VHT-SIGB 812.

Figure 14:
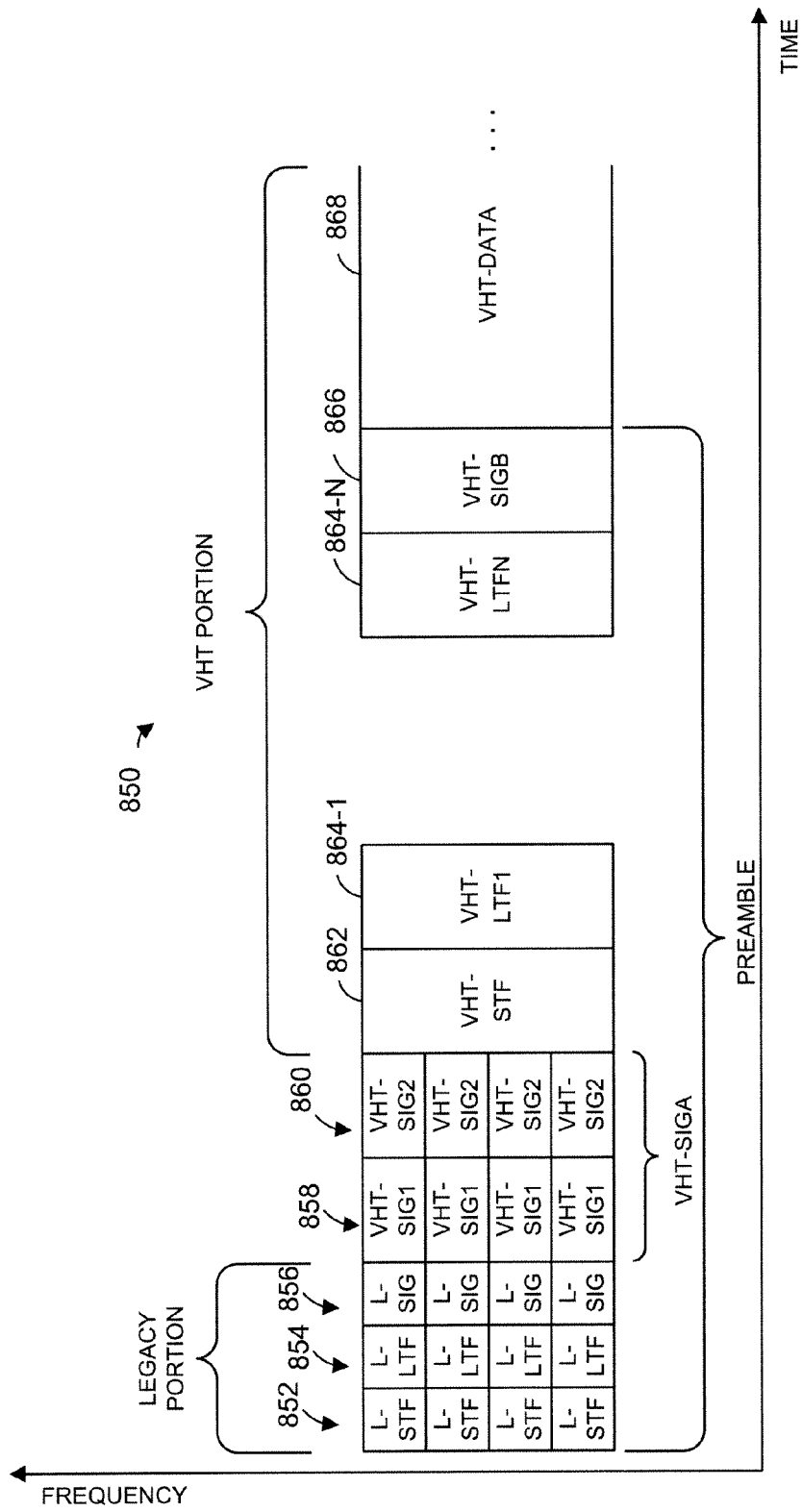
FIG. 14 is a diagram of an example data unit format, according to yet another embodiment.

FIG. 14 is a diagram of an example data unit 850 that AP 14 is configured to transmit to the client station 25-1, according to an embodiment. The client station 25-1 is also configured to transmit the data unit 350 to the AP 14.

The data unit 850 is similar to the data unit 250 in FIG. 7. The data unit 850 includes two VHT-SIG fields (VHT-SIG1 858 and VHT-SIG2 860) that generally correspond to VHT-SIGA 258 (FIG. 7). In an embodiment, a first CRC field is generated using bits in both VHT-SIG1 858 and VHT-SIG2 860, and a second CRC field is generated using bits in VHT-SIGB 866.

Figure 15:
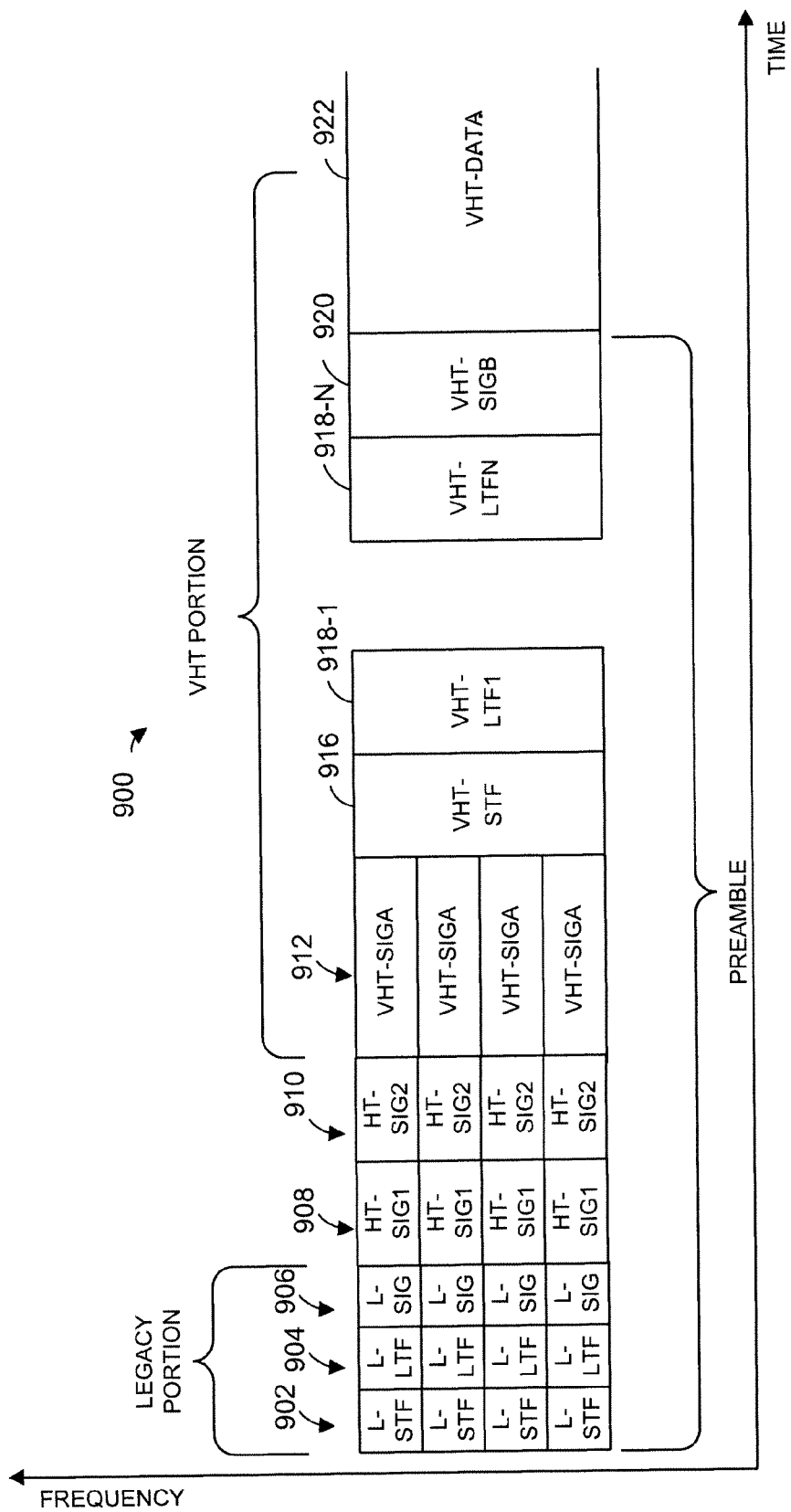
FIG. 15 is a diagram of an example data unit format, according to still another embodiment.

The data unit 250, the data unit 800, and the data unit 850 described above with respect to FIG. 7, FIG. 13, and FIG. 14, respectively, are suitable for "mixed mode" situations, i.e., when the WLAN 10 includes a client station (i.e., the legacy client station 25-4) that conforms to the IEEE 802.11a Standard and/or the IEEE 802.11n Standard, but not the VHT protocol. The data units 250, the data unit 800, the data unit 850 can be utilized in other situations as well. In some embodiments, the data units 250, 800, 850 are altered for operation in other situations. For example, FIG. 15 shows a diagram of an example data unit 900 that AP 14 is configured to transmit to the client station 25-1, according to an embodiment. In an embodiment, the client station 25-1 is also configured to transmit the data unit 900 to the AP 14. The data unit 900 is similar to the data unit 250, except that the data unit 900 includes two HT signal fields, HT-SIG1 908 and HT-SIG2 910. In an embodiment, HT-SIG1 908 corresponds to the HT-SIG1 portion 150 (FIG. 5) and HT-SIG2 910 corresponds to the HT-SIG2 portion 160 (FIG. 5). In an embodiment, the CRC for HT-SIG1 908 and HT-SIG2 (e.g., CRC field 170-18 (FIG. 15)), the CRC for VHT-SIGA 912 (e.g., CRC field 334 (FIG. 8), and the CRC for VHT-SIGB 920 are generated using the same CRC generation scheme (e.g., according to equations 1-4) and/or using the same CRC generator (e.g., the CRC generator 200 of FIG. 6).

The data unit 900 is suitable for "mixed mode" situations, i.e., when the WLAN 10 includes a client station (i.e., the legacy client station 25-4) that conforms to the IEEE 802.11a Standard and/or the IEEE 802.11n Standard, but not the VHT protocol. In a different "mixed mode" situation when, for example, the WLAN 10 includes a client station (i.e., the legacy client station 25-4) that conforms to the IEEE 802.11n Standard, but not the VHT protocol, but WLAN 10 does not include any client stations that conform to the IEEE 802.11a Standard, but not the IEEE-802.11n Standard or the VHT protocol, the legacy portion (e.g., L-SIGs 402, L-LTFs 404, and L-SIGs 406 in FIG. 15) may be omitted from data unit. Furthermore, in "VHT greenfield" situations, when WLAN 10 does not include any legacy client stations, i.e. all client stations in the vicinity of AP14 conform to at least the VHT protocol, HT-SIG1 908 and HT-SIG2 910 may be omitted from the data unit 900 as well.

Figure 16:
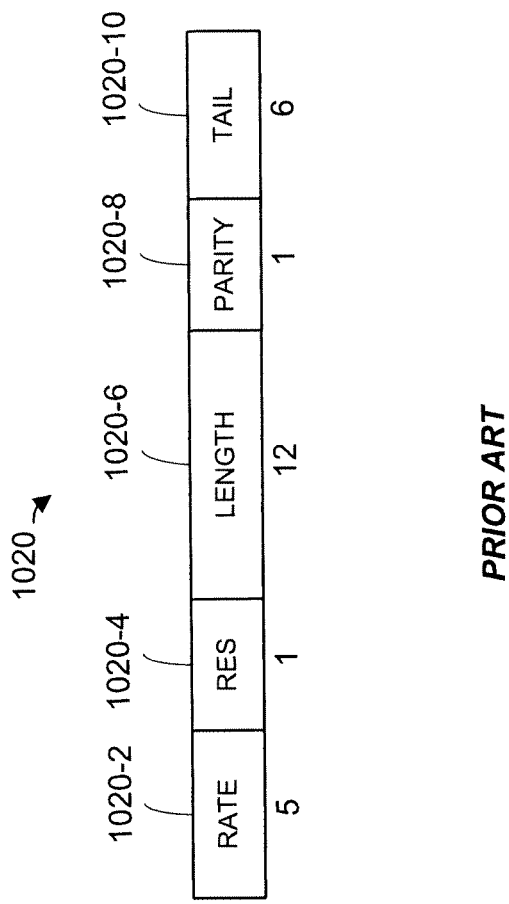
FIG. 16 is a diagram of a prior art signal field.

In other embodiments, various VHT-SIG CRC configurations described above are generated also using the legacy L-SIG field (e.g., L-SIG field 256 in FIG. 7, L-SIG field 806 in FIG. 13, etc.). FIG. 16 is a diagram of bit allocation in the legacy L-SIG field 1020, as defined in the legacy IEEE 802.11a protocol. L-SIG field 1020 contains a rate subfield 1020-2, a reserved subfield 1020-4, and a length subfield 1020-6. Further, L-SIG 1020 contains a 1-bit parity subfield 1020-8, and 6 bit tail subfield 1020-10. Hence, the legacy signal field 1020 is protected by only one parity bit. Therefore, in some embodiments of the present disclosure, extra protection is provided for the legacy signal field L-SIG by including the L-SIG bits in the various VHT-SIG CRC generation schemes described herein. For example, in an embodiment, L-SIG bits are included in CRC calculation for one of the VHT-SIG segments (VHT-SIGA or VHT-SIGB). In another embodiment, L-SIG bits are combined with all VHT-SIG segments and a single CRC is generated for the signal bits in L-SIG, VHT-SIGA, and VHT-SIGB. Alternatively, in yet another embodiment, uVDT-GIG field includes two separate CRC fields, one for the protection of the L-SIG bits alone and another for the protection of the VHT-SIG bits alone.

As discussed above, in some embodiments, CRC bits for the one or more VHT-SIG CRC subfield(s) are generated using a CRC generation scheme corresponding to Equations 1-5 and/or using the CRC generator 200 of FIG. 6. According to one such embodiment, CRC is generated using the initialization polynomial of Equation 2, and the generator polynomial of Equation 4, and the resulting 8 bit CRC is included, for example, as the one or more CRC subfields for VHT-SIG fields.

In another embodiment, the CRC generation scheme corresponding to Equations 1-5 and/or the CRC generator 200 of FIG. 6 is used, but the number of bits defined for the VHT-SIG CRC is less than eight. According to one such embodiment, CRC is generated according to the Equations 1-5 and/or using the CRC generator 200 of FIG. 6, and the generated CRC is truncated prior to being included in the data unit. For example, in one such embodiment, where 4 bits are defined for the CRC, the 8-bit CRC is generated and the first 4 bits are included in the data unit. Alternatively, continuing with the same example, the last 4 bits are included in the data unit, in another embodiment. Similarly, as another example, if 6 bits are defined for the new CRC, the first 6 bits (or the last 6 bits) are included in the data unit, according to an embodiment.

In other embodiments, CRC fields for the one or more VHT-SIG CRC subfield(s) is generated using a scheme different from the scheme corresponding to Equations 1-5. For example, the CRC generator polynomial that is used to generate the CRC for the VHT-SIG field(s) is different from the generator polynomial in Equation 4, according to an embodiment. In an embodiment, the initialization polynomial that is used to generate the CRC for the VHT-SIG field(s) is also different. Example CRC generation schemes, used in some such embodiments, are described below.

According to an embodiment, if L is the number of bits defined for the CRC, and N is the number of bits used to generate the CRC, the general form equation for CRC generation scheme is:

$$\text{crc}(D) = (M(D) + A(D))^L \text{modulo} G(D) \qquad \text{(Equation 6)}$$

where $$M(D) = m_o D^N + m_1 D^{N-1} + \ldots + M_{N-1} D + m_N \qquad \text{(Equation 7)}$$

is a polynomial that represents the bits used to generate the CRC (i.e., the bits that the CRC protects). Continuing with Equation 6, A(D) is the initialization polynomial defined, in general form, as:

$$A(D) = a_o D^N + a_1 D^{N-1} + \ldots + a_{L-1} D^{N-L+2} + a_L D^{N-L+1} \qquad \text{(Equation 8)}$$

In one embodiment, the coefficients $a_o$ through $a_L$ of Equation 8 are set to all ones. Other values for coefficients $a_o$ through $a_L$ of Equation 8 are used in other embodiments. Referring again to Equation 6, G(D) is a generator polynomial, the form of which depends on the number of CRC bits L and the number of bits to be protected N. For example, if L=4 and N=38, an example generator polynomial G(D) according to an embodiment is $$G(D) = D^4 + D^2 + D + 1 \qquad \text{(Equation 9)}$$

Similarly, another example generator polynomial G(D) according to another embodiment where L=4 and N=38 is:

$$G(D) = D^4 + D + 1 \qquad \text{(Equation 10)}$$

Just as another example, in an embodiment where 6 bits are defined for the CRC, and 36 bits are used to generate the CRC, an example generator polynomial G(D) is:

$$G(D)=D^6+D+1 \quad \text{(Equation 11)}$$

Figure 17:
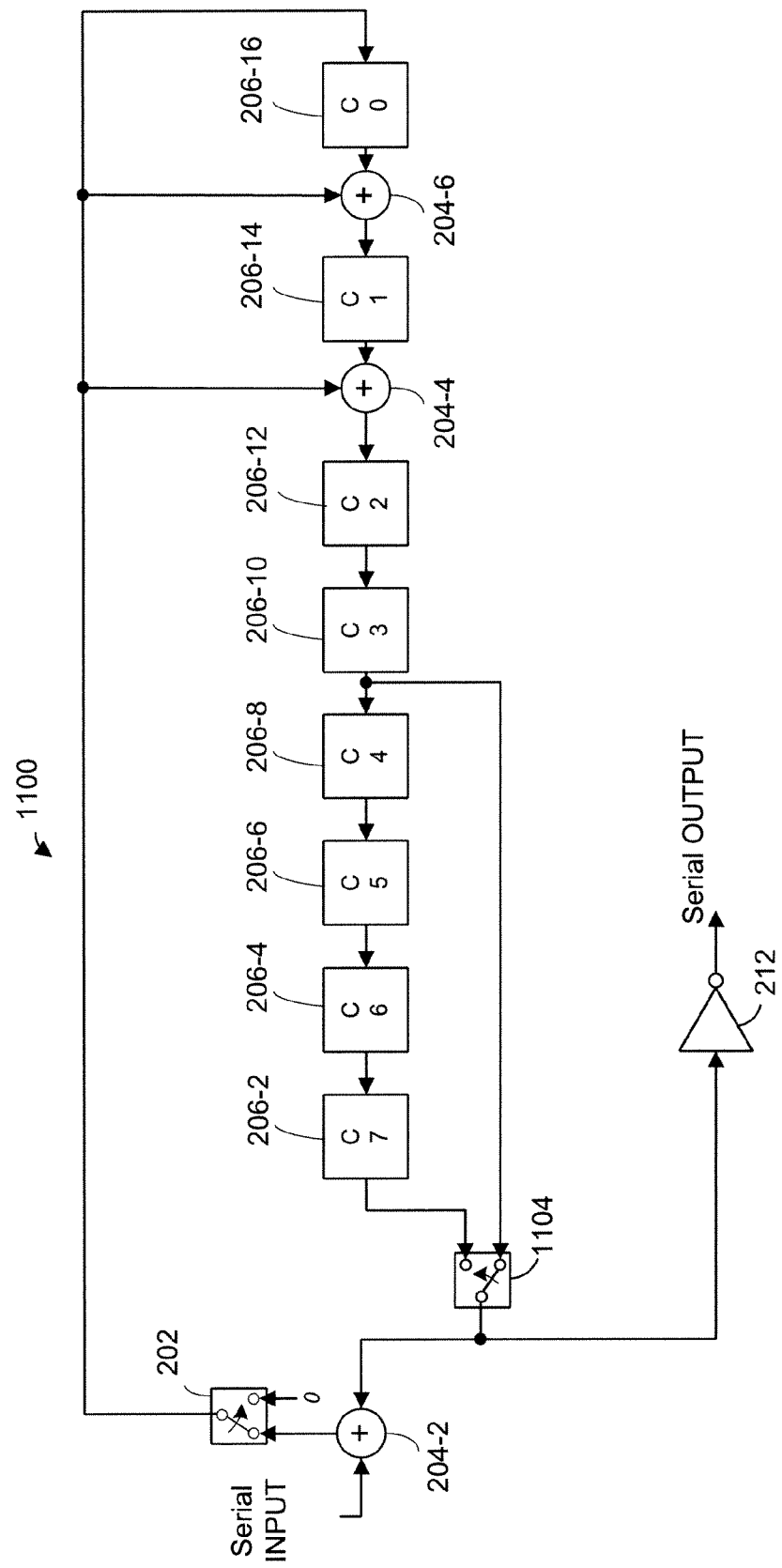
FIG. 17 is a diagram of an example CRC generator, according to an embodiment.

The example generator polynomials of Equations 9-11 retain certain properties from the generator polynomial of Equation 4. For example, the generator polynomials of Equations 9-11 are divisible by D+1. This property allows the generated CRC to detect any odd number of bit errors. Further, the example generator polynomials in Equations 9-10 are chosen such that the operation of the VHT-SIG CRC generation utilizes common elements with the operation of the legacy generation scheme (shown in FIG. 6). For example, FIG. 17 is a diagram of a CRC generator 1100 that is used to generate the CRC bits according to Equations 6-8, and using the generator polynomial G(D) in Equation 9, according to an embodiment. The CRC generator 1100 is similar to the CRC generator 200 of FIG. 6, and like-numbered elements are not discussed. A switch 1104 is has a first input coupled to the output of the delay element 206-2, and a second input coupled to the output of the delay element 206-10. An output of the switch 1104 is coupled to one of the inputs of the adder 204-2 and the input of the inverter 212. In operation, the values of all delay elements 206 are initially reset to all ones, according to an embodiment. In another embodiment, initialization values other than all ones are utilized. When the switch 1104 selects the output of the delay element 205-2, the CRC generator 1100 functions as the CRC generator 200 of FIG. 6. On the other hand, when the switch 1104 selects the output of the delay element 206-10, the CRC generator 1100 operates according to Equation 9.

Figure 18:
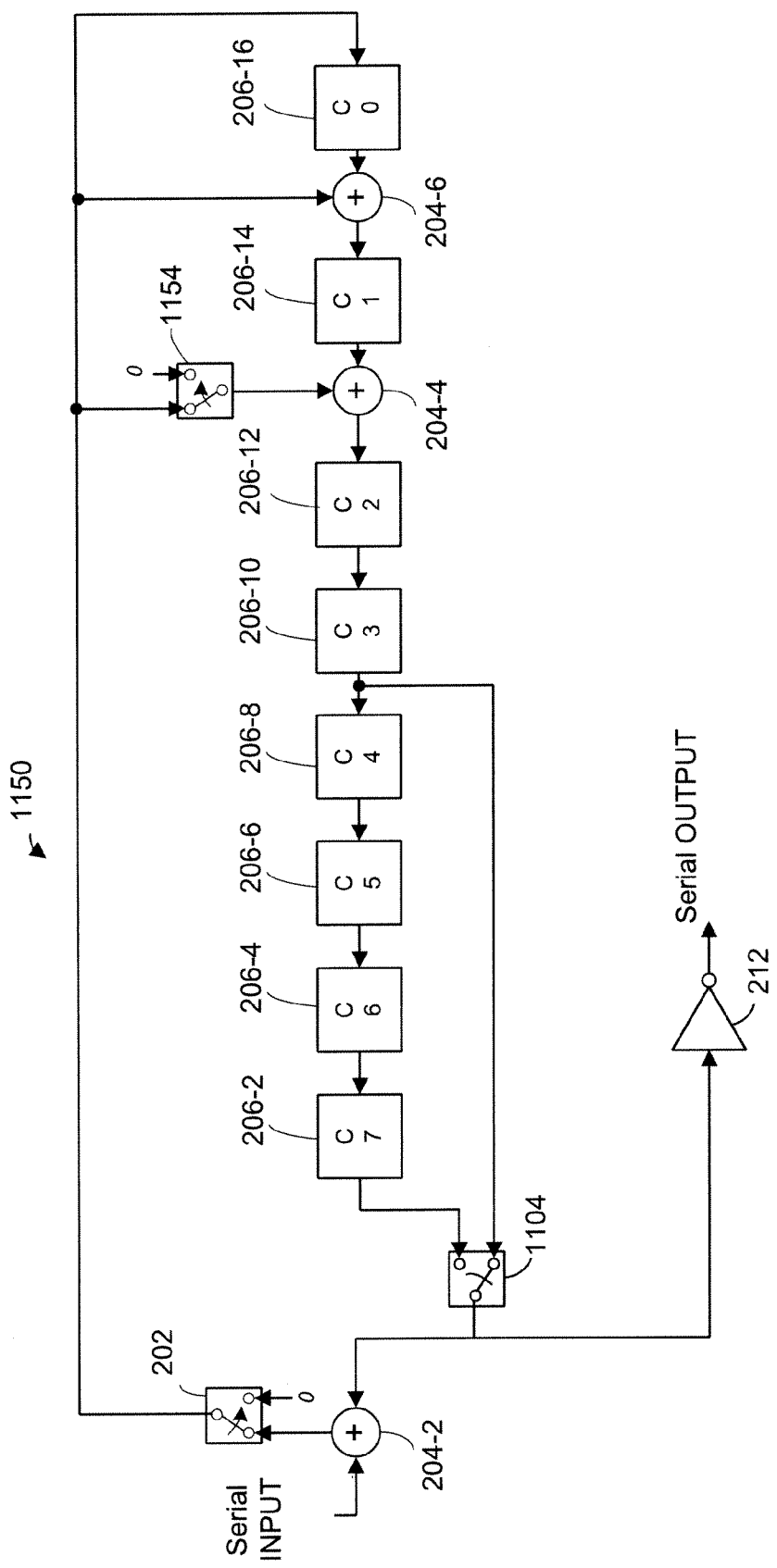
FIG. 18 is a diagram of another example CRC generator, according to another embodiment.

For example, FIG. 18 is a diagram of another CRC generator 1150 that is used to generate the CRC bits according to Equations 6-8, and using the generator polynomial G(D) in Equation 10, according to an embodiment. The CRC generator 1150 is similar to the CRC generator 200 of FIG. 6 and the CRC generator 1100 of FIG. 17, and like-numbered elements are not discussed. A switch 1154 is has a first input coupled to the output of the switch 202, and a second input coupled to zero. An output of the switch 1154 is coupled to one of the inputs of the adder 204-4. In operation, the values of all delay elements 206 are initially reset to all ones, according to an embodiment. In another embodiment, initialization values other than all ones are utilized. When the switch 1104 selects the output of the delay element 205-2, and the switch 1154 selects the output of the switch 202, the CRC generator 1150 functions as the CRC generator 200 of FIG. 6. On the other hand, when the switch 1104 selects the output of the delay element 206-10 and the switch 1154 selects zero, the CRC generator 1150 operates according to Equation 10.

Figure 19:
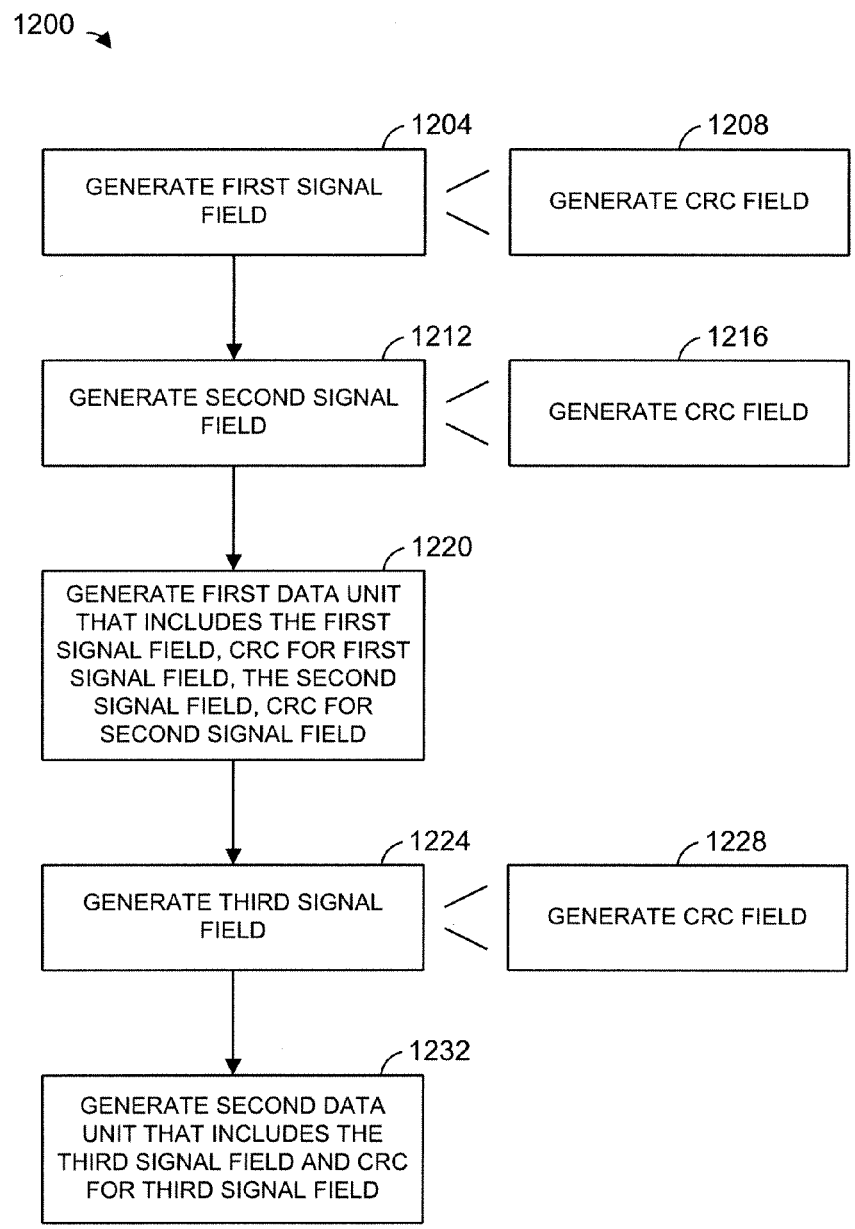
FIG. 19 is a flow diagram of an example method of generating data units, according to an embodiment.

FIG. 19 is a flow diagram of an example method 1200 for generating data units, according to an embodiment. The method 1200 is implemented by the network interface 16 (e.g., the PHY processing unit 20) (FIG. 1), in an embodiment. The method 1200 is implemented by the network interface 27 (e.g., the PHY processing unit 29) (FIG. 1), in another embodiment. In other embodiments, the method 1200 is implemented by other suitable network interfaces.

At block 1204, a first signal field is generated. For example, in an embodiment, a VHT-SIGA field, such as the VHT-SIGA field 258 (FIG. 7) or another suitable signal field, is generated. Block 1204 includes generating a CRC field for the first signal field (block 1208) according to a generator polynomial (e.g., according Equation 4, 9, 10, etc.). In an embodiment, the CRC field for the first signal field is included in the first signal field. In another embodiment, the CRC field for the first signal field is not included in the first signal field, but is included in another field outside of the first signal field.

At block 1212, a second signal field is generated. For example, in an embodiment, a VHT-SIGB field, such as the VHT-SIGB 268 (FIG. 7) or another suitable signal field, is generated. Block 1212 includes generating a CRC field for the second signal field (block 1216) according to the generator polynomial. In an embodiment, the CRC field for the second signal field is not included in the second signal field, but is included in another field outside of the second signal field. In another embodiment, the CRC field for the second signal field is included in the second signal field.

At block 1220, a first data unit is generated so that the first data unit includes the first signal field generated at block 1204, the CRC field generated at block 1208, the second signal field generated at block 1212, and the CRC field generated at block 1212, and so that the first data unit conforms to a first communication protocol (e.g., the VHT protocol or another suitable protocol). The first data unit is a PHY data unit, in an embodiment. For example, the first data unit has a format the same as or similar to the data unit 250 (FIG. 7) or another suitable data unit.

At block 1224, a third signal field is generated. For example, in an embodiment, an HT-SIG field, such as the HT-SIG field 140 (FIG. 5) or another suitable signal field, is generated. Block 1224 includes generating a CRC field for the third signal field (block 1228) according to the generator polynomial. In an embodiment, the CRC field for the third signal field is included in the third signal field. In another embodiment, the CRC field for the third signal field is not included in the third signal field, but is included in another field outside of the third signal field.

At block 1232, a second data unit is generated so that the second data unit includes the third signal field generated at block 1224 and the CRC field generated at block 1228, and so that the second data unit conforms to a second communication protocol (e.g., a legacy protocol or another suitable protocol). The second data unit is a PHY data unit, in an embodiment. For example, the second data unit has a format the same as or similar to the data unit 78 (FIG. 3), the data unit 90 (FIG. 4), or another suitable data unit.

In some embodiments, blocks 1224, 1228, and 1232 are omitted.

Figure 20:
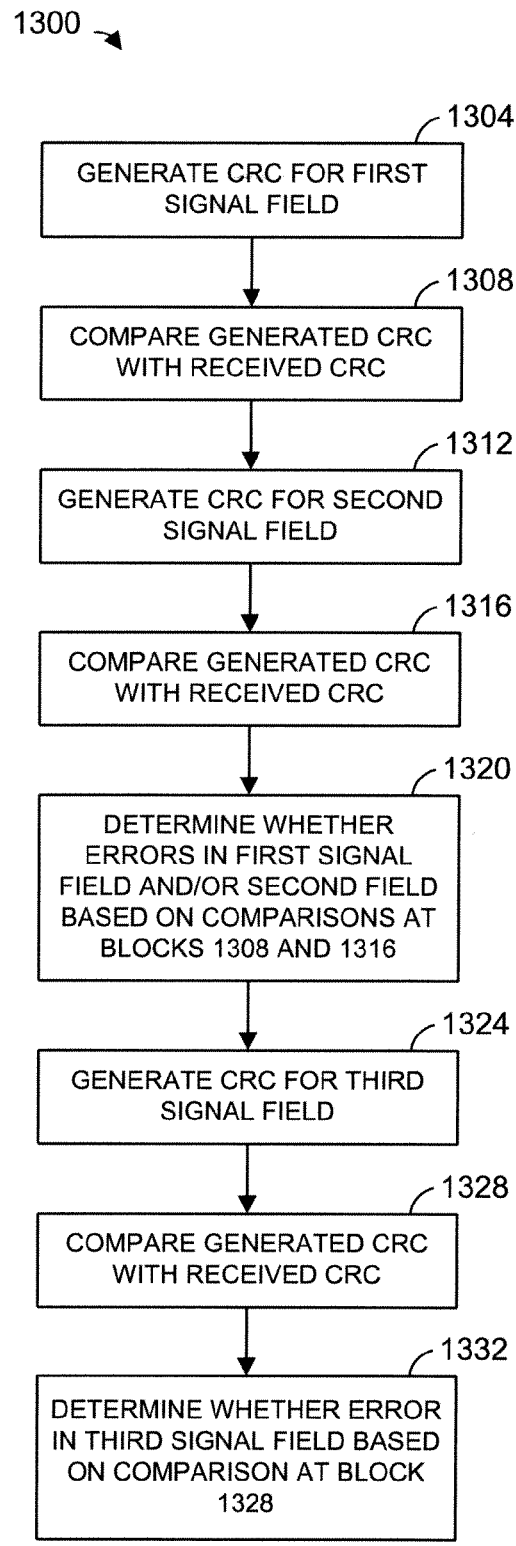
FIG. 20 is a flow diagram of an example method for detecting errors in data units, according to an embodiment.

FIG. 20 is a flow diagram of an example method 1300 for determining whether errors are present in signal fields of a first data unit and a second data unit, according to an embodiment. The first data unit and the second data unit are received via a wireless network such as the network 10 (FIG. 1) or another suitable network. In an embodiment, the first data unit includes a first signal field (e.g., VHT-SIGA field 258 (FIG. 7) or another suitable signal field) and a second signal field (e.g., VHT-SIGB 268 (FIG. 7) or another suitable signal field), and the first data unit (e.g., the data unit 250 (FIG. 7) or another suitable data unit) conform is to a first communication protocol, such as the VHT protocol or another suitable protocol. In an embodiment, the second data unit includes a third signal field (e.g., the HT-SIG field 140 (FIG. 5) or another suitable signal field), and the second data unit (e.g., the data unit 78 (FIG. 3), the data unit 90 (FIG. 4), or another suitable data unit) conforms to a second communication protocol (e.g., a legacy protocol or another suitable protocol).

The method 1300 is implemented by the network interface 16 (e.g., the PHY processing unit 20) (FIG. 1), in an embodiment. The method 1300 is implemented by the network interface 27 (e.g., the PHY processing unit 29) (FIG. 1), in another embodiment. In other embodiments, the method 1300 is implemented by other suitable network interfaces.

At block 1304, a CRC for the first signal field is generated according to a suitable generator polynomial (e.g., according to Equation 4, 9, 10, etc.). The first signal field is a VHT-SIGA field, such as the VHT-SIGA field 258 (FIG. 7) or another suitable signal field, in an embodiment.

At block 1308, the CRC generated at block 1304 is compared to a CRC field that corresponds to the first signal field and is included in the first data unit. For example, the CRC generated at block 1304 is compared to a CRC field included in the first signal field, in an embodiment. In another embodiment, the CRC generated at block 1304 is compared to a CRC field not included in the first signal field, but included in the first data unit. In an embodiment, the CRC generated at block 1304 is compared to the CRC field 334 (FIG. 8) or another suitable CRC field.

At block 1312, a CRC for the second signal field is generated according to the generator polynomial. The second signal field is a VHT-SIGB field, such as the VHT-SIGB field 268 (FIG. 7) or another suitable signal field, in an embodiment.

At block 1316, the CRC generated at block 1312 is compared to a CRC field that corresponds to the second signal field and is included in the first data unit. In an embodiment, the CRC generated at block 1312 is compared to a CRC field not included in the second signal field, but included in the first data unit. In another embodiment, the CRC generated at block 1312 is compared to a CRC field included in the second signal field.

At block 1320, it is determined whether there are one or more errors in the first signal field and/or the second signal field based on the comparisons at bock 1308 and 1316. For example, it is determined that there are one or more errors in the first signal field based on whether it is determined at block 1308 that the CRC generated at block 1304 is different than the CRC field that corresponds to the first signal field and that is included in the first data unit, in an embodiment. Similarly, it is determined that there are one or more errors in the second signal field based on whether it is determined at block 1316 that the CRC generated at block 1312 is different than the CRC field that corresponds to the second signal field and that is included in the first data unit, in an embodiment.

At block 1324, a CRC for the third signal field is generated according to the generator polynomial. The third signal field is an HT-SIG field, such as the HT-SIG field 140 (FIG. 5) or another suitable signal field.

At block 1328, the CRC generated at block 1324 is compared to a CRC field that corresponds to the third signal field and is included in the second data unit. For example, the CRC generated at block 1324 is compared to a CRC field included in the third signal field, in an embodiment. In another embodiment, the CRC generated at block 1324 is compared to a CRC field not included in the third signal field, but included in the second data unit. In an embodiment, the CRC generated at block 1324 is compared to an HT-SIG field in the second data unit, such as the HT-SIG field 140 (FIG. 5) or another suitable signal field.

At block 1332, it is determined whether there are one or more errors in the third signal field based on the comparison at bock 1328. For example, it is determined that there are one or more errors in the third signal field based on whether it is determined at block 1328 that the CRC generated at block 1324 is different than the CRC field that corresponds to the third signal field and that is included in the second data unit, in an embodiment.

In some embodiments, the method 1300 is for determining whether errors are present in signal fields of the first data unit, and blocks 1324, 1328, and 1332 are omitted.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention. For example, one or more portions of methods described above may be performed in a different order (or concurrently) and still achieve desirable results.

What is claimed is:

1. A method for generating data units for transmission in a wireless network, the method comprising:

generating a first signal field that includes formatting information for a first data unit, wherein generating the first signal field includes generating a cyclic redundancy check (CRC) field for the first signal field according to a generator polynomial, and wherein the CRC field for the first signal field is generated based on applying the generator polynomial to a first number of bits of the first signal field;

generating a second signal field that includes formatting information for the first data unit, wherein the second signal field does not overlap with the first signal field, and wherein generating the second signal field includes generating a CRC field for the second signal field according to the generator polynomial, and wherein the CRC field for the second signal field is generated based on applying the generator polynomial to a second number of bits of the second signal field, wherein the second number of bits is less than the first number of bits;

generating the first data unit to include i) the CRC for the second signal field and ii) a preamble of the first data unit having a) the first signal field, b) the CRC for the first signal field, and c) the second signal field, wherein the first data unit conforms to a first communication protocol;

generating a third signal field that includes formatting information for a second data unit, wherein generating the third signal field includes generating a CRC field for the third signal field according to the generator polynomial; and generating a second data unit, wherein a preamble of the second data unit includes i) the third signal field, and ii) the CRC for the third signal field, wherein the second data unit conforms to a second communication protocol.

2. A method according to claim 1, wherein the first signal field has a first length, and
wherein the second signal field has a second length shorter than the first length.

3. A method according to claim 1, wherein generating the first signal field includes generating the first signal field so that the CRC field for the first signal field is included in the first signal field.

4. A method according to claim 3, wherein generating the second signal field includes generating the second signal field so that the CRC field for the second signal field is included in the second signal field.

5. A method according to claim 1, wherein the first signal field is in portion of the first data unit that is to be transmitted omnidirectionally, and
wherein the second signal field is in portion of the first data unit that is to be transmitted using beamforming.

6. A method according to claim 1, wherein the first signal field and the second signal field are separated by one or more training fields.

7. An apparatus, comprising:
a wireless network interface configured to
generate a first signal field that includes formatting information for a first data unit, wherein generating the first signal field includes generating a cyclic redundancy check (CRC) field for the first signal field according to a generator polynomial, and wherein the CRC field for the first signal field is generated based on applying the generator polynomial to a first number of bits of the first signal field;

generate a second signal field that includes formatting information for the first data unit, wherein the second signal field does not overlap with the first signal field, and wherein generating the second signal field includes generating a CRC field for the second signal field according to the generator polynomial, and wherein the CRC field for the second signal field is generated based on applying the generator polynomial to a second number of bits of the second signal field, wherein the second number of bits is less than the first number of bits, generate the first data unit to include i) the CRC for the second signal field and ii) a preamble of the first data unit having a) the first signal field, b) the CRC for the first signal field, and c) the second signal field, wherein the first data unit conforms to a first communication protocol;

generate a third signal field that includes formatting information for a second data unit, wherein generating the third signal field includes generating a CRC field for the third signal field according to the generator polynomial; and generate a second data unit, wherein a preamble of the second data unit includes i) the third signal field, and ii) the CRC for the third signal field, wherein the second data unit conforms to a second communication protocol.

8. An apparatus according to claim 7, wherein the wireless network interface is configured to generate the second signal field with a length shorter than a length of the first signal field.

9. An apparatus according to claim 7, wherein the wireless network interface is configured to generate the first signal field to include the CRC field for the first signal field.

10. An apparatus according to claim 9, wherein the wireless network interface is configured to generate the second signal field to include the CRC field for the second signal field.

11. An apparatus according to claim 7, wherein the first signal field is in first portion of the first data unit,
wherein the wireless network interface is configured to transmit the first portion omnidirectionally, and
wherein the second signal field is in a second portion of the first data unit and
wherein the wireless network interface is configured to transmit the second portion using beamforming.

12. An apparatus according to claim 7, wherein the first signal field and the second signal field are separated by one or more training fields.

13. A method for detecting errors in data units, the method comprising:
generating a cyclic redundancy check (CRC) for a first signal field according to a generator polynomial, wherein the CRC field for the first signal field is generated based on applying the generator polynomial to a first number of bits of the first signal field, and wherein the first signal field is included in a preamble of a first data unit received via a wireless network, wherein the first data unit conforms to a first communication protocol;

comparing the generated CRC for the first signal field with a received CRC for the first signal field included in the first data unit;

determining whether there are one or more errors in the first signal field based on the comparison of the generated CRC for the first signal field with the received CRC for the first signal field;

generating a CRC for a second signal field according to the generator polynomial, wherein the second signal field does not overlap with the first signal field, wherein the CRC field for the second signal field is generated based on applying the generator polynomial to a second number of bits of the second signal field, wherein the second number of bits is less than the first number of bits, and wherein the second signal field is included in the preamble of the first data unit;

comparing the generated CRC for the second signal field with a received CRC for the second signal field included in the first data unit;

determining whether there are one or more errors in the second signal field based on the comparison of the generated CRC for the second signal field with the received CRC for the second signal field;

generating a CRC for a third signal field according to the generator polynomial, wherein the third signal field is included in a preamble of a second data unit received via the wireless network, wherein the second data unit conforms to a second communication protocol;

comparing the generated CRC for the third signal field with a received CRC for the third signal field included in the second data unit; and determining whether there are one or more errors in the third signal field based on the comparison of the generated CRC for the third signal field with the received CRC for the third signal field.

14. A method according to claim 13, wherein the first signal field has a first length, and
wherein the second signal field has a second length shorter than the first length.

15. A method according to claim 13, wherein the received CRC field for the first signal field is included in the first signal field.

16. A method according to claim 15, wherein the received CRC field for the second signal field is included in the second signal field.

17. A method according to claim 13, wherein the first signal field and the second signal field are separated by one or more training fields.

18. An apparatus, comprising:
a wireless network interface configured to
generate a cyclic redundancy check (CRC) for a first signal field according to a generator polynomial, wherein the CRC field for the first signal field is generated based on applying the generator polynomial to a first number of bits of the first signal field, and wherein the first signal field is included in a preamble of a first data unit received via a wireless network, wherein the first data unit conforms to a first communication protocol,
compare the generated CRC for the first signal field with a received CRC for the first signal field included in the first data unit,
determine whether there are one or more errors in the first signal field based on the comparison of the generated CRC for the first signal field with the received CRC for the first signal field,
generate a CRC for a second signal field according to the generator polynomial, wherein the second signal field does not overlap with the first signal field, wherein the CRC field for the second signal field is generated based on applying the generator polynomial to a second number of bits of the second signal field, wherein the second number of bits is less than the first number of bits, and wherein the second signal field is included in the preamble of the first data unit,
compare the generated CRC for the second signal field with a received CRC for the second signal field included in the first data unit,
determine whether there are one or more errors in the second signal field based on the comparison of the generated CRC for the second signal field with the received CRC for the second signal field,
generate a CRC for a third signal field according to the generator polynomial, wherein the third signal field is included in a preamble of a second data unit received via the wireless network, wherein the second data unit conforms to a second communication protocol,
compare the generated CRC for the third signal field with a received CRC for the third signal field included in the second data unit, and
determine whether there are one or more errors in the third signal field based on the comparison of the generated CRC for the third signal field with the received CRC for the third signal field.

19. An apparatus according to claim 18, wherein the first signal field has a first length, and
wherein the second signal field has a second length shorter than the first length.

20. An apparatus according to claim 18, wherein the received CRC field for the first signal field is included in the first signal field.

21. An apparatus according to claim 20, wherein the received CRC field for the second signal field is included in the second signal field.

22. An apparatus according to claim 18, wherein the first signal field and the second signal field are separated by one or more training fields.

* * * * *